(12) United States Patent
Oh

(10) Patent No.: US 8,719,810 B2
(45) Date of Patent: May 6, 2014

(54) PROGRAM UPGRADE SYSTEM AND METHOD FOR OVER THE AIR-CAPABLE MOBILE TERMINAL

(75) Inventor: Sung-Jo Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1294 days.

(21) Appl. No.: 11/777,732

(22) Filed: Jul. 13, 2007

(65) Prior Publication Data

US 2008/0216066 A1 Sep. 4, 2008

(30) Foreign Application Priority Data

Jul. 14, 2006 (KR) .......................... 10-2006-0066509

(51) Int. Cl.
*G06F 9/44* (2006.01)
*G06F 9/445* (2006.01)
*G06F 15/177* (2006.01)

(52) U.S. Cl.
USPC ............................ 717/173; 717/178; 709/221

(58) Field of Classification Search
USPC .................................................. 717/173, 178
See application file for complete search history.

(56) References Cited

U.S. PATENT DOCUMENTS

| | | | |
|---|---|---|---|
| 6,018,747 A * | 1/2000 | Burns et al. ..................... | 717/172 |
| 6,871,259 B2 * | 3/2005 | Hagiwara et al. .............. | 711/103 |
| 7,197,634 B2 * | 3/2007 | Kruger et al. ..................... | 713/1 |
| 7,483,964 B1 * | 1/2009 | Jackson et al. ................. | 709/221 |
| 2002/0091720 A1 | 7/2002 | Liu et al. | |
| 2003/0028867 A1 * | 2/2003 | Kryloff et al. ................. | 717/171 |
| 2003/0074657 A1 * | 4/2003 | Bramley, Jr. ................... | 717/168 |
| 2004/0123282 A1 | 6/2004 | Rao | |
| 2004/0152455 A1 | 8/2004 | Herle | |
| 2004/0230963 A1 * | 11/2004 | Rothman et al. ............... | 717/168 |
| 2004/0237081 A1 | 11/2004 | Homiller | |
| 2005/0038955 A1 * | 2/2005 | Chen ............................. | 711/103 |
| 2005/0132382 A1 * | 6/2005 | McGuire et al. .............. | 719/311 |
| 2005/0257023 A1 | 11/2005 | Peng | |

(Continued)

FOREIGN PATENT DOCUMENTS

| EP | 1205842 A2 * | 5/2002 | ................ G06F 9/44 |
|---|---|---|---|
| JP | 2004-213201 | 7/2004 | |

(Continued)

OTHER PUBLICATIONS

Hunt et al., "An Empirical Study of Delta Algorithms", Lecture Notes in Computer Science, 1996, p. 49-65.*

(Continued)

*Primary Examiner* — Ryan Coyer
(74) *Attorney, Agent, or Firm* — The Farrell Law Firm P C

(57) ABSTRACT

An apparatus and method for updating a program of a mobile terminal using an Over-The-Air (OTA) programming mechanism is provided. The program upgrade apparatus includes a first memory for storing a reference version of the program and at least one upgrade package; a second memory for loading an upgrade version of the program; a communication unit for enabling the mobile terminal to communicate with an external system; and a control unit for controlling the communication unit to download the upgrade package in response to an upgrade notification message from the external system, installing the upgrade package within the first memory, generating an upgrade version of the program by merging the upgrade package and the reference version in response to an install command, and operating the mobile terminal with the upgraded version of the program.

22 Claims, 30 Drawing Sheets

(56) References Cited

U.S. PATENT DOCUMENTS

| | | |
|---|---|---|
| 2006/0174240 A1* | 8/2006 | Flynn .............................. 717/170 |
| 2007/0150524 A1* | 6/2007 | Eker et al. ...................... 707/203 |
| 2007/0277167 A1* | 11/2007 | Smith et al. .................... 717/168 |
| 2008/0320471 A1* | 12/2008 | Maeda ............................ 717/178 |

FOREIGN PATENT DOCUMENTS

| | | |
|---|---|---|
| JP | 2004-348434 | 12/2004 |
| JP | 2005-222140 | 8/2005 |
| JP | 2006-518059 | 8/2006 |
| JP | 2006-340196 | 12/2006 |
| RU | 2 250 490 | 4/2005 |
| WO | WO 98/56149 | 12/1998 |
| WO | WO 01/98926 | 12/2001 |
| WO | WO 2005/119432 | 12/2005 |

OTHER PUBLICATIONS

Suel et al., "Algorithms for Delta Compression and Remote File Synchronization", Lossless Compression Handbook, 2002, 24pg.*

* cited by examiner

PROGRAM UPGRADE SYSTEM AND METHOD FOR OVER THE AIR-CAPABLE MOBILE TERMINAL

PRIORITY

This application claims priority to an application entitled "PROGRAM UPGRADE SYSTEM AND METHOD FOR OTA-CAPABLE MOBILE TERMINAL" filed in the Korean Intellectual Property Office on Jul. 14, 2006 and assigned Serial No. 2006-0066509, the contents of which is incorporated herein by reference.

BACKGROUND OF THE INVENTION

1. Field of the Invention

The present invention relates to a system upgrade method and, in particular, to an apparatus and method for updating a program of a mobile terminal using an Over-The-Air (OTA) programming mechanism.

2. Description of the Related Art

Electronic devices, such as mobile phones and Personal Digital Assistants (PDAs), contain firmware and application software that are either provided by the manufacturers of the electronic devices, telecommunication carriers, or third parties. Such firmware and application software may contain software bugs and often requires upgrade. In order to fix and upgrade the firmware and application software, a user visits a customer care center operated by the manufacturer or the carrier. For an OTA capable device, the firmware or software upgrade can be performed by the OTA mechanism in which the firmware or software upgrades are wirelessly distributed to the device.

In order to use the OTA, the electronic device incorporates a download module for downloading an upgrade package and an upgrade processing module for performing upgrade of a target firmware or software with the downloaded upgrade package. However, most conventional OTA capable devices are limited in OTA operation stability.

SUMMARY OF THE INVENTION

The present invention has been made in an effort to solve the above problems, and the present invention provides a program upgrade apparatus and method for an OTA-capable device for updating a program by merging a reference version of the program and an upgrade package received over the air.

The present invention provides a program upgrade apparatus and method for an OTA-capable portable device for updating a firmware of the portable device in such an order of storing an upgrade package received over the air within a first memory, upgrading the program by combining the upgrade package with a reference version of the program, and loading the upgraded program on a second memory to operate the portable device.

In accordance with an aspect of the present invention, the above and other objects are accomplished by a program upgrade apparatus for a mobile terminal that operates with a program. The program upgrade apparatus includes a first memory for storing a reference version of the program and at least one upgrade package; a second memory for loading an upgrade version of the program; a communication unit for enabling the mobile terminal to communicate with an external system; and a control unit for controlling the communication unit to download the upgrade package in response to an upgrade notification message from the external system, installing the upgrade package within the first memory, generating an upgrade version of the program by merging the upgrade package and the reference version in response to an install command, and operating the mobile terminal with the upgraded version of the program.

In accordance with another aspect of the present invention, the above and other objects are accomplished by a program upgrade method for a mobile terminal operating with a program. The program upgrade method includes downloading an upgrade package of the program from an external system; installing the upgrade package within first memory; loading the reference version and the upgrade package in response to an upgrade request; generating an upgrade version by merging the reference version and the upgrade package; loading the upgrade version on a second memory; and operating the mobile terminal with the upgrade version.

In accordance with another aspect of the present invention, the above and other objects are accomplished by a program upgrade apparatus for a mobile terminal operating with a program. The program upgrade apparatus includes a first memory having a first region for storing a reference version of the program and at least one second region for storing at least one upgrade package; a second memory for storing an upgraded version of the program; a downloader for downloading the upgrade package from an external system; an installer for installing the upgrade package downloaded by the downloader within the second region of the first memory; and a translator for loading the upgrade package and the reference version from the first memory, generating the upgraded version by merging the upgrade package with the reference version, and storing the upgraded version within the second memory.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Figure 1:
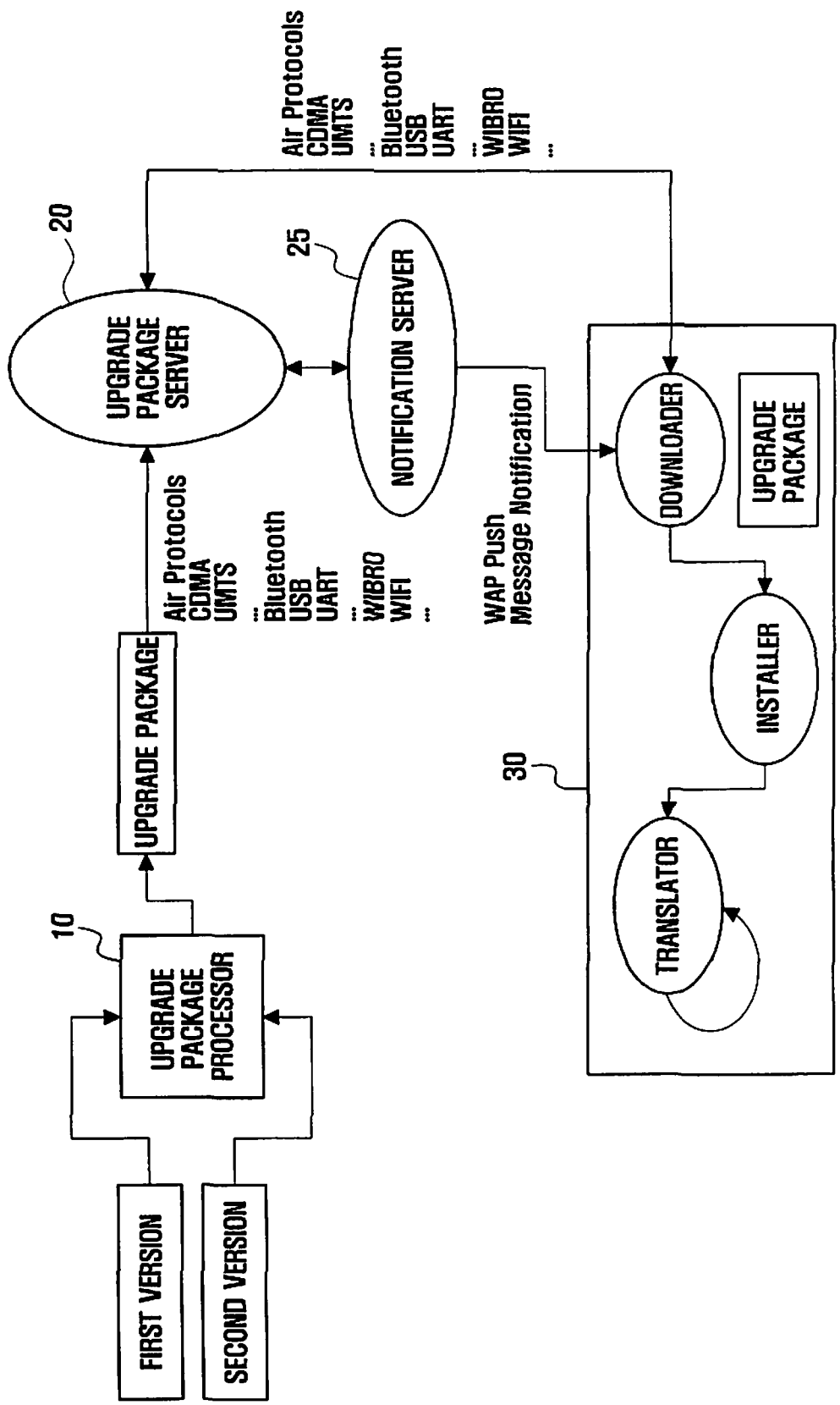
FIG. 1 is a diagram illustrating a program upgrade system according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the following embodiments, an upgrade is a process modifying source codes of a firmware or software of a system using an upgrade package for fixing bugs and improving usability or performance. An upgrade package is a data collection generated in accordance with differences between the old and new versions of a target program such that the upgrade package is merged with the old version for upgrading the program to the new version. The upgrade package includes upgrade data and/or install data. The install data include history data and map data. The upgrade data are data to replace specific data of the old version in the upgrade process. The install data are a set of information for updating an old version to a new version of the program. The install data includes history data for informing a relationship of the upgrade package and an old version to be upgraded and map data for mapping the blocks representing the new version to the old version. The map data are composed of macroblock addresses and commands to be executed for processing the macroblocks. The commands include C for "copy", S for "shift", and M for "modify," and the macroblock addresses can be represented by block indexes of the reference version of the program. A recipient device is installed by the first version of the software in manufacturing stage and can download and store at least one upgrade package when an upgrade event occurs.

A first memory is a memory for storing upgrade packages of the first and second versions of the program. A second memory is a memory for loading a program upgraded by merging the first version and the upgrade packages represented by the second version. The first and second memories are preferably implemented with first and second memory regions in a single memory unit and can also be implemented as physically separated two memory modules. In the following embodiments, the first and second memories are described as individual memory modules. The first memory is a flash memory as a nonvolatile memory, and the second memory is a Synchronous Dynamic Random Access Memory (SDRAM) as a volatile memory. The first memory stores the first version of the program and at least one of upgrade package as the second version of the program. The upgrade package includes history data for identifying versions of the program (including map data) and upgrade data. If an upgrade event occurs by a system initialization or a user command, the system loads the second version of the program upgraded by merging the first version and the upgrade package on the second memory such that the system operates with the second version of the program. An upgrade package includes the install data and upgrade data. The install data can include history data and/or map data. The first version of the program can be an initial version of the program, and the second version of the program includes the upgrade data produced on the basis of the difference between the first and second versions of the program and install data for installing the upgrade data. The program loaded on the second memory can be a program created by combining the first version and the upgrade package of the second version of the program.

The program upgrade system is preferably divided into a transmission system for producing and transmitting upgrade packages and at least one recipient device for receiving the upgrade packages and upgrade a target program with the upgrade packages. In the following embodiments, the recipient device is represented by a mobile terminal. The mobile terminal is a multimedia-enabled device such as mobile phone, digital camera, laptop computer and Portable Multimedia Player (PMP).

Referring to FIG. 1, a program upgrade system includes an upgrade package processor 10, an upgrade package server 20, a notification server 25 and a recipient device 30.

If a new version (second version) of a program is introduced, the upgrade package processor 10 generates an upgrade package from a pair of old version (first version) and a new version (second version) of the program and then transmits the upgrade package to the upgrade package server 20. Here, the upgrade package processor 10 communicate with the upgrade package server 20 through a wireless channel established utilizing a wireless communication standard such as Code Division Multiple Access (CDMA), Universal Mobile Telecommunication System (UMTS), Wireless Broadband (WiBro), Wireless Fidelity (Wi-Fi), Worldwide Interoperability for Microwave Access (WiMAX), Bluetooth® and Zigbee, or a wired communication standard such as Universal Serial Bus (USB) and Universal Asynchronous Receiver/Transmitter (UART). If an upgrade package is received from the upgrade package processor 10, the upgrade package server 20 informs the notification server 25 of the issuance of the upgrade package. The notification server 25 broadcasts a notification message to a plurality of recipient devices 20 so that the recipient devices 30 download the upgrade package. Also, the upgrade package server 20 and the recipient devices 20 communicate with each other through a wireless channel established utilizing wireless communication standard such as CDMA, UMTS, WiBro, Wi-Fi, WiMAX, Bluetooth® and Zigbee, or a wired communication standard such as USB and UART.

If the upgrade package is successfully downloaded, the recipient device 30 stores the upgrade package of the second version within a memory unit. The recipient device 30 includes the first and second memories. The first and second memories are preferably implemented as a single module or two separate modules. The first memory stores the upgrade packages downloaded from the upgrade package server 20 for upgrading the program to corresponding versions, and the second memory stores the second version produced by upgrading the first version of the program using the upgrade package. The recipient device 30 stores the upgrade package downloaded from the upgrade package server 20 within the first memory as the second version of the program. If an upgrade is requested, the recipient device 30 generates the second version by merging the first version and the upgrade package and loads the second version in the second memory for operating with the second version.

An operation of the upgrade package processor 10 is described hereinafter. In the following description, the upgrade package processor 10 compresses the first and second versions of the program, produces upgrade data and map data through a comparison analysis, and generates an upgrade package by packing the upgrade data and the install data including the map data. For example in FIG. 3, the upgrade package processor 10 compresses the first and second versions of the program, produces upgrade data and installs data not having any map data through a comparison analysis, and generates an upgrade package by packing the upgrade data and install data.

Referring to FIGS. 2 to 5B, a first version generator 50 generates the first version of the program, and the second version generator 55 generates the second version of the program. The first version is an initial version installed in the recipient device 30 or a reference version designated later. The first version is installed in the first memory of the recipient device. The second version is an upgrade version of the first version and can be downloaded from the upgrade package server 20. A first compressor 160 divides the data of the first and second versions and compresses the divided data in a macroblock unit. By compressing the data in the macroblock, the first and second versions can be compared in unit of the block. The comparator 110 compares the blocks of the first and second versions and determines whether two blocks of each pair are identical with each other. If the blocks are not identical with each other, the comparator 110 search for a block identical with the corresponding block of the second version in a search range of the first version. Next, the comparator 110 transmits information on the comparison result and the block indexes of corresponding blocks of the first version to an install data generator 180.

That is, the comparator 110 compares the block of the second version to the block of the first version and transmits, if the two blocks are identical with each other, the comparison result to the install data generator 180 together with the block index. On the other hand, if the two blocks are not identical with each other, the comparator 110 searches for the block identical with the current block of the second version in the search range of the first version. If an identical block is retrieved in the search range, the comparator 110 transmits the comparison result to the install data generator 180 together with the identical block of the first version. That is, the comparator 110 compares the current block to the blocks in regressive and progressive directions in the search range. If an identical block is not retrieved in the search range, the comparator 110 transmits the search result to the install data together with the block index of the second version.

Figure 2:
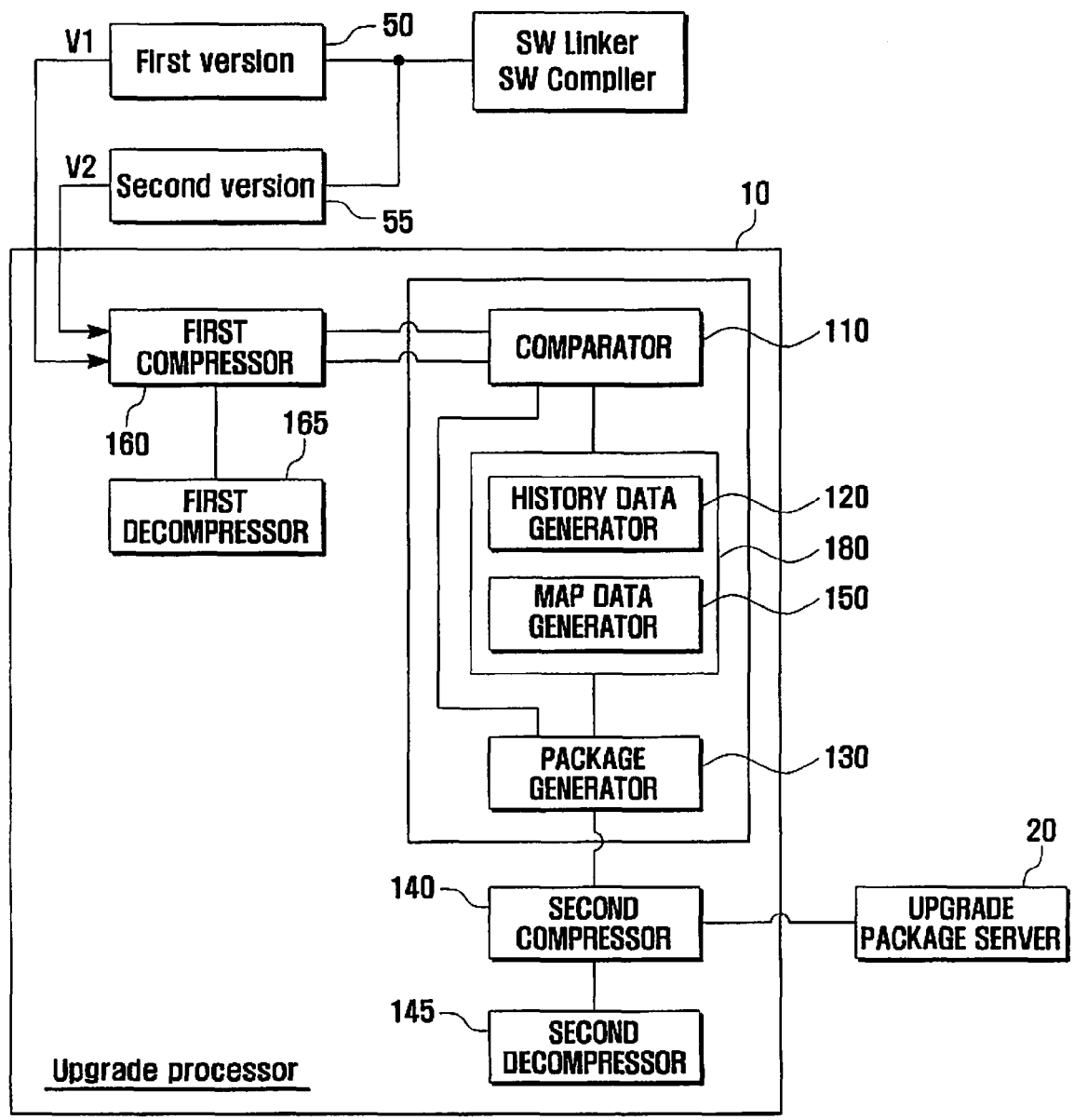
FIG. 2 is a block diagram illustrating a configuration of an upgrade package processor of a program upgrade system in accordance with an exemplary embodiment of the present invention.
Figure 3:
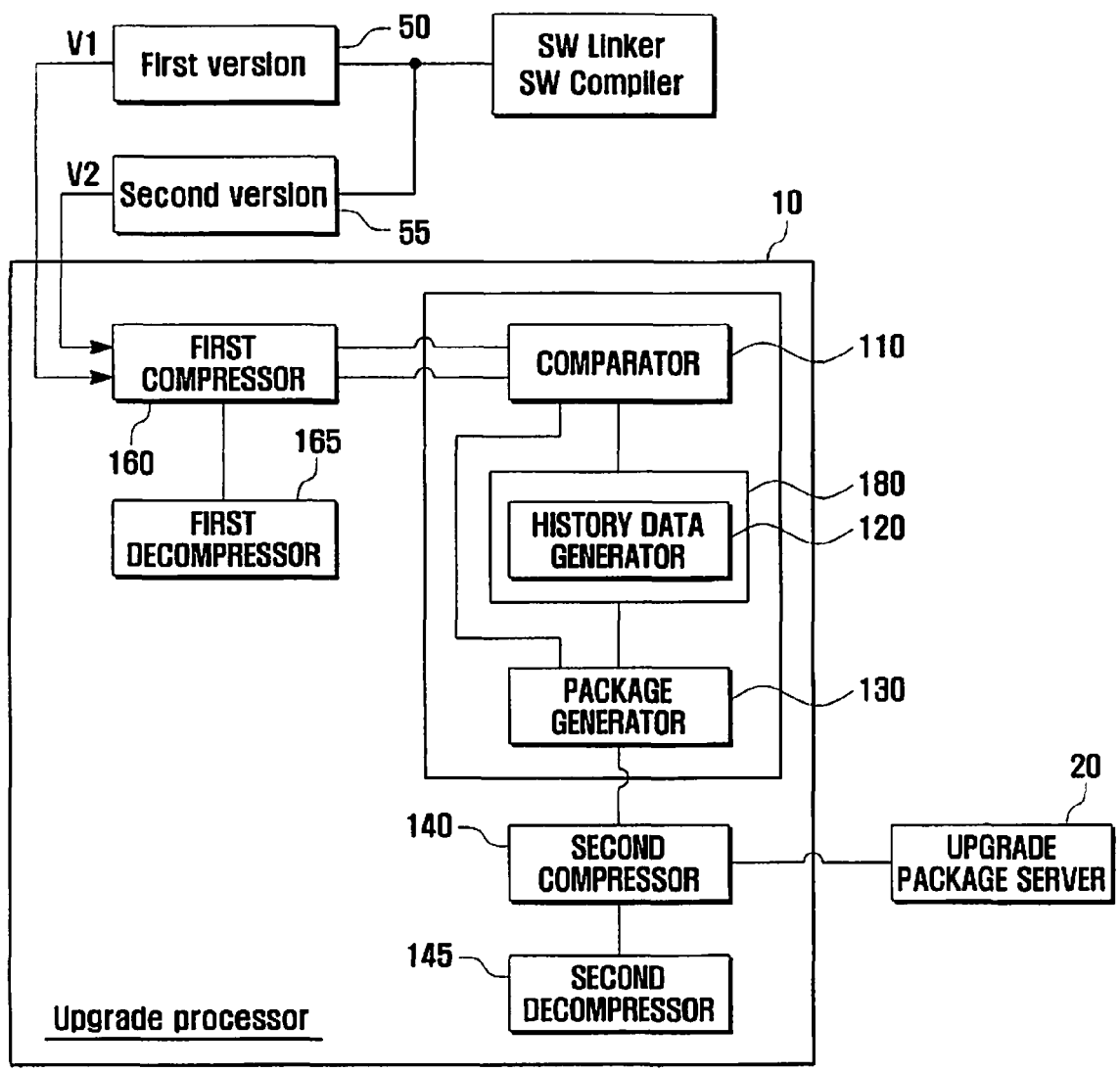
FIG. 3 is a block diagram illustrating a configuration of an upgrade package processor of a program upgrade system in accordance with another exemplary embodiment for the present invention.

The install data generator 180 is preferably provided with a history data generator 120 and a map data generator 150, as shown in FIG. 2, or can be provided with only the history data generator 120, as shown in FIG. 3. The history data generator 120 has a version number of the second version. That is, if the version number of the second version is 5, this means that the first version is upgraded to the second version of which version number is 5. The map data generator 150 analyzes the output of the comparator 110 and generates the map data composed of instructions and block indexes.

Referring to FIGS. 4A to 4E, the upgrade package includes upgrade data, history data, and map data in the upgrade package processor of FIG. 2, or composed of the upgrade data and the history data in the upgrade package processor of FIG. 3. when the second version is produced using the first version of the program, gap regions can be provided in the first version of the program in order to reduce a number of the shift operation in the upgrade process.

An operation for generating the upgrade package containing map data is described hereinafter with reference to FIGS. 4A to 4E. Firstly, the upgrade package processor 10 compares the first version (V1) and the second version (V2) of the program in a macroblock unit (MB), determines attributes (C for copy, M for modify, and S for shift) of the blocks, and generates an upgrade package in accordance with the attributes of the blocks. In the case of the upgrade package having the map data, the map data are generated with command strings format composed of commands C for copy, M for modify (to insert or replace as same size), and S for shift in following format:

[Cmd][start block No, number of block][flag][distance] [difference]

where Cmd denotes a command of C, M, or S, "start block No" denotes a block index of a start block affected by the command, and "number of block" denotes a number of the blocks affected by the command. "flag" has a value of 0, 1, or 2. The flag value is set to 0 when the Cmd is "C" (for just copy) or S (just shift), 1 when the blocks can be obtained from V with the Cmd M, and 2 when the block cannot be obtained from V1 but in delta package with the Cmd M. The "distance" denotes a block index indicating a location of a block of V2 in V1. The "difference" denotes a difference between the blocks of V1 and V2.

Figure 4A:
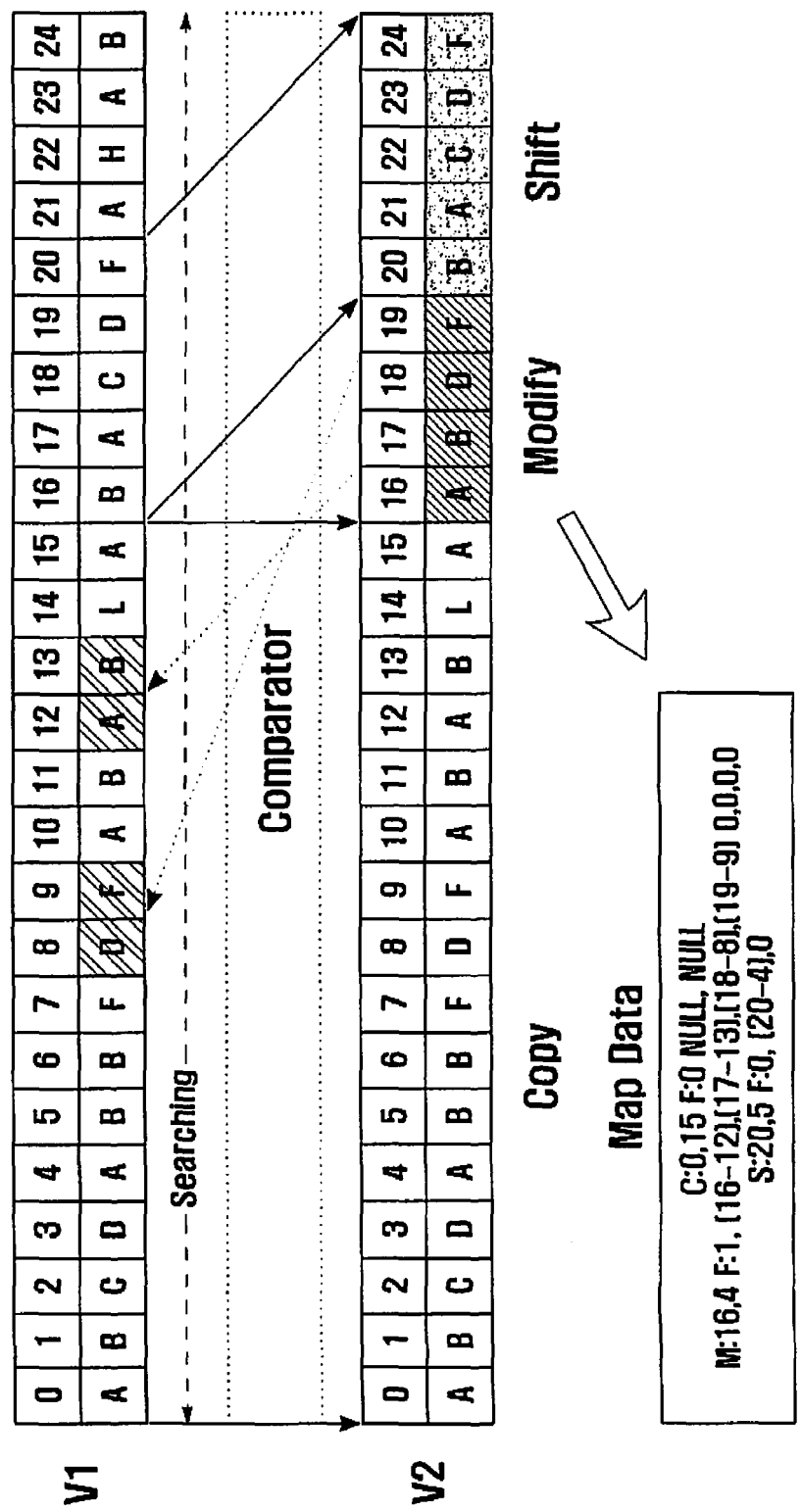
FIGS. 4A to 4F are diagrams illustrating processes of generating upgrade package at the upgrade package processor of FIGS. 2 and 3.

In this embodiment, if the blocks of V1 and V2 differ from each other, modified blocks are generated. If the modified blocks are detected, the upgrade package processor 10 searches for the modified blocks of V2 in the search range of V1. In the example of FIGS. 4A to 4C, 15 blocks are searched for the modified blocks in both the regressive and progressive direction. If identical blocks are found in the search range, the upgrade package processor 10 generates an upgrade package with the indexes of the blocks rather than generation of update data. FIG. 4A shows how to generate the map data when the modified blocks of the V2 are retrieved in the search range of the V1. Referring to FIG. 4A, the upgrade package processor 10 compares V1 and V2 in macroblock units. If the modified blocks of the V2 are retrieved in the search range of the V1, the upgrade package processor 10 generates map data including indexes of the blocks of V1 identical with the modified blocks of V2 rather than generating upgrade data with the modified blocks themselves.

That is, the upgrade package processor 10 retrieves the blocks identical with the modified blocks of V2 in the search range of V1 and contains the indexes the retrieved blocks in the map data.

In FIG. 4A, the 16th to 19th blocks of the V2 are modified, and 20th to 24th blocks of the V2 are shifted. In this case, the upgrade package processor 10 retrieves the 12th, 13th, 8th, and 9th blocks of the V1 as the blocks identical with the 16th to 19th blocks of the V2. That is, the upgrade package processor 10 checks that the 16th and 17th block of the V2 are identical with 12th and 13th blocks of the V1 and the 18th and 19th blocks are identical with 8th and 9th blocks of the V1. In this case, the map data generated by the upgrade package processor 10 can be formatted as shown in Table 1.

TABLE 1

C: 0, 15, F: 0, null, null
M: 16, 4 F: 1, (16-12), (17-13), (18-8), (19-9), 0, 0, 0, 0
S: 20, 5 F: 0, (20-4), 0
or
C: 0, 15, F: 0, null, null
M: 16, 4, F: 1, (16-12), (17-13), (18-8), (19-9), 0, 0, 0, 0
S: 20, 5, F: 0, (20-16), 0

In Table 1, the map data indicates that the 0th to 15th blocks of V2 are identical with those of V1, the 16th to 19th blocks of V2 are identical with 12th, 13th, 8th, and 9th blocks of V1, and the 20th to 24th blocks of V2 are identical with the 16th to 20th blocks of V1. That is, when the modified blocks of the V2 are found in the search range of the V1, the upgrade package processor 10 generates the map data mapping the modified blocks of the V2 to the blocks found in the search range of the V1. In this case, the upgrade package is generated with the history data and the map data shown in Table 1.

Figure 4B:
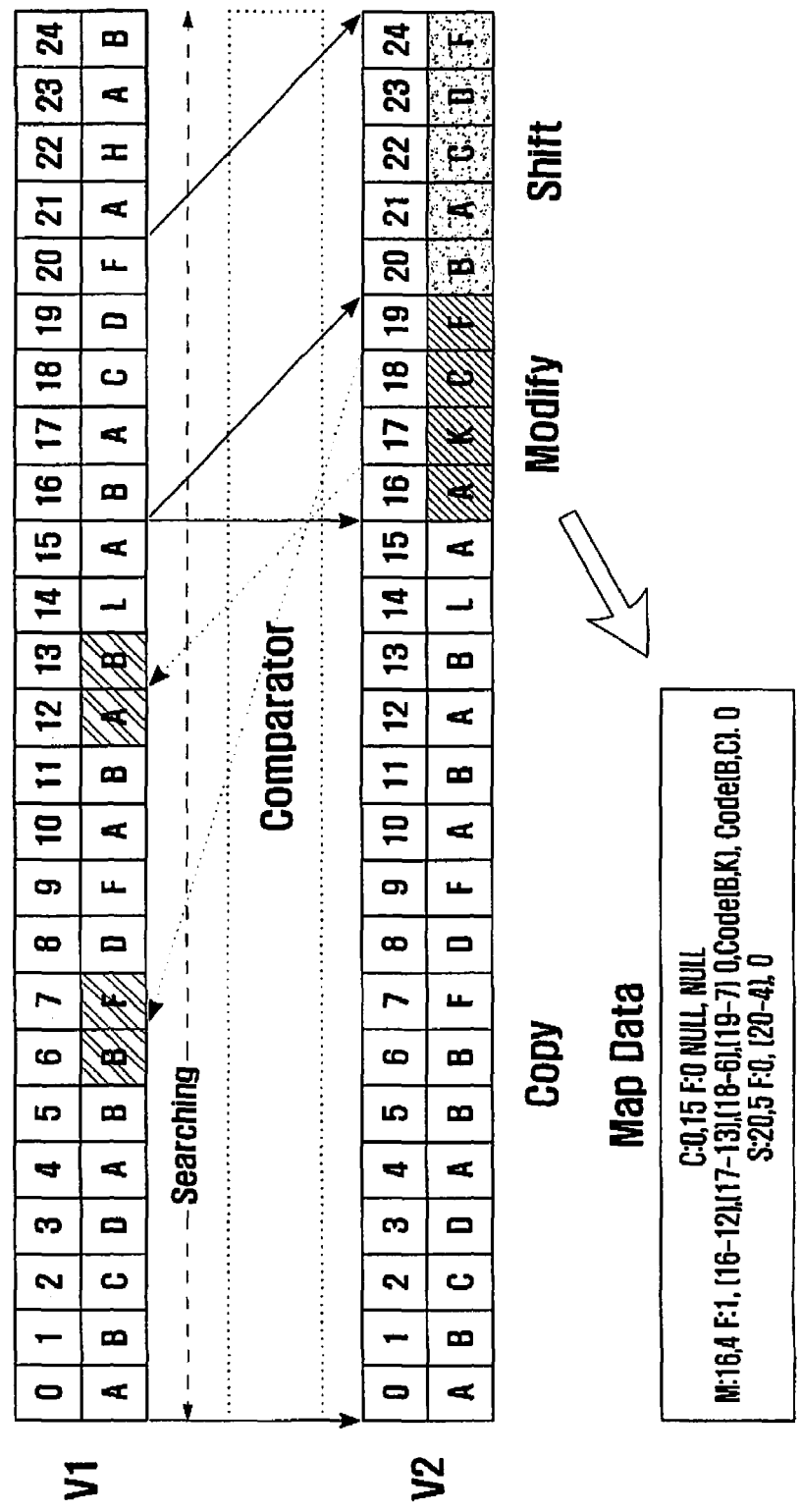

FIG. 4B shows how to generate map data when the modified blocks of V2 are not retrieved but similar blocks exist in the search range of V1. As shown in FIG. 4B, the 16th to 19th blocks of V2 are modified and the original 16th to 19th blocks of V1 are right-shifted to become the 20th to 24th blocks of V2. In table 1, "S20,5, F:0, (20–4), 0" indicates that 5 blocks (20th to 24th blocks) of V2 including 20th block are identical with 5 blocks (16th to 20th blocks) of the first version, prior to 4 blocks from 20th block (20–4=16). "S20,5, F:0, (20–4), 0" indicates that the 20th block of V2 is identical with 16th block of V1, and 20th to 24th blocks of V2 are identical with 16th to 20th blocks of V1. The shift blocks are indicated in the form of "S:20,5, F:0, (20–4), 0."

Referring to FIG. 4b, the upgrade package processor 10 recognizes that the 16th block of V2 is identical with the 12th block in the search range of V1 but a block identical with the 17th block of V2 does not exist in the search range, and a block identical with the 18th block of V2 does not exist but the 19th block of V2 is identical with the 6th block in the search range. In this case, the upgrade package processor 100 determines that the 16th and 17th blocks are similar to the 12th and 13th block of V1 as modified blocks and the 18th and 19th blocks are similar to the 6th and 7th blocks as modified blocks. Accordingly, the upgrade package processor 10 generates the upgrade package using the V1 and V2 as shown in FIG. 3B, with the map data as shown in table 2.

TABLE 2

C: 0, 15, F: 0, null, null
M: 16, 4 F: 1, (16-12), (17-13), (18-6), (19-7), 0, code (B, K), code (B, C), 0
S: 20, 5 F: 0, (20-4), 0

In Table 2, the map data indicates that the 0th to 15th blocks of V2 are identical with those of V1 and the 20th to 24th blocks of V2 are identical with the 16th to 20th blocks of V1. Also, the map data indicates that the 16th and 19th blocks of V2 are identical with 12th and 7th, the 17th block of V2 is entropy-encoded (code (B,K)) by a difference with the 13th block of V1, and the 18th block of V2 is entropy-encoded (code (B,C)) by a difference with the 8th block of V1. In the case that a block identical with the modified block of V2 is not found in the search range of V1 as in FIG. 4B, the upgrade package processor 10 generates the map data by mapping the modified blocks of V2 to corresponding blocks of V1 and performing entropy coding on the basis of the difference of the blocks of V1 and V2.

Figure 4C:
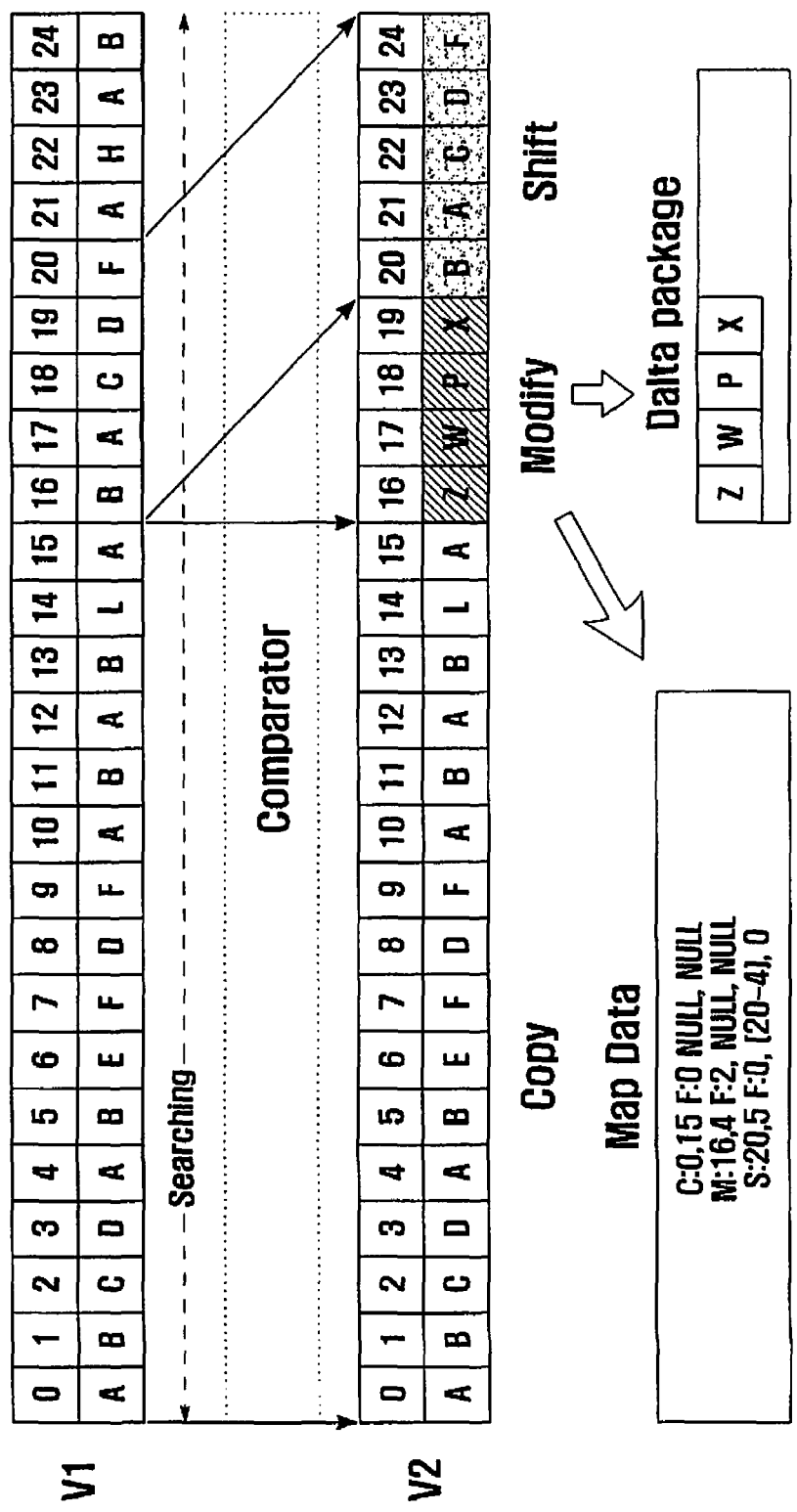

FIG. 4C shows how to generate the map data when the modified blocks of V2 are not retrieved in the search range of V1.

The upgrade package processor 10 compares V1 and V2 in block units, checks the attributes (C, M, or S) of blocks of V2, and generates the upgrade data on the basis of the attributes of the blocks. The data of modified blocks are packed into the upgrade package as the upgrade data. As described above, the upgrade package processor 10 checks whether a block identical with a modified block of the V2 exists in the search range of V1. If an identical block is not found, the upgrade package processor 10 performs the entropy coding with the difference of the blocks of V1 and V2 to generate upgrade data.

In FIG. 4C, the 16th to 19th blocks having data Z, W, P, and X are inserted in V2. The upgrade package processor 10 searches for blocks identical with the newly inserted blocks of V2 in the search range of V1. Since there are no blocks identical inserted blocks of V2 in the search range of V1, the upgrade package processor 10 designates the attribute M to the inserted blocks and sets the blocks as the upgrade data.

As shown in FIG. 4C, there are no blocks identical with the 16th to 19th blocks of V2 in the search range of V1. In this case, the upgrade package processor 10 generates the map data as shown in Table 3 by entropy coding the data Z, W, P, and X.

TABLE 3

C: 0, 15, F: 0, null, null
M: 16, 4 F: 2, null, null
S: 20, 5, F: 0, (20-4), 0

In Table 3, the map data inform that 0th to 15th blocks of V2 are identical with those of V1, the 20th to 24th blocks of V2 are identical with the 16th to 20th blocks of V1, and the 16th to 19th blocks of V2 are entropy-coded into Z, W, P, and X. When a modified block is not found in the search range as in FIG. 3C, the upgrade package processor 10 sets the flag of the block to 2 (F=2) and generates separate upgrade data. In this case, the upgrade package includes the history data, map data, and upgrade data.

In the case of FIG. 3C, the upgrade package processor 10 also can generate the upgrade package without additional upgrade data. Table 4 shows the map data when the upgrade data are excluded from the upgrade package.

TABLE 4

C: 0, 15, F: 0, null, null
M: 16, 4 F: 2, null, Z, W, P, X
S: 20, 5, F: 0, (20-4), 0

In the case that the modified blocks are not found in the search range of V1 (see FIG. 4C), the upgrade package processor produces map data by entropy-encoding the data of the modified blocks. If the map data are generate in the form of Table 4, the upgrade package processor 10 does not produce additional upgrade data and generates the upgrade package with the history data and the map data.

Figure 4D:
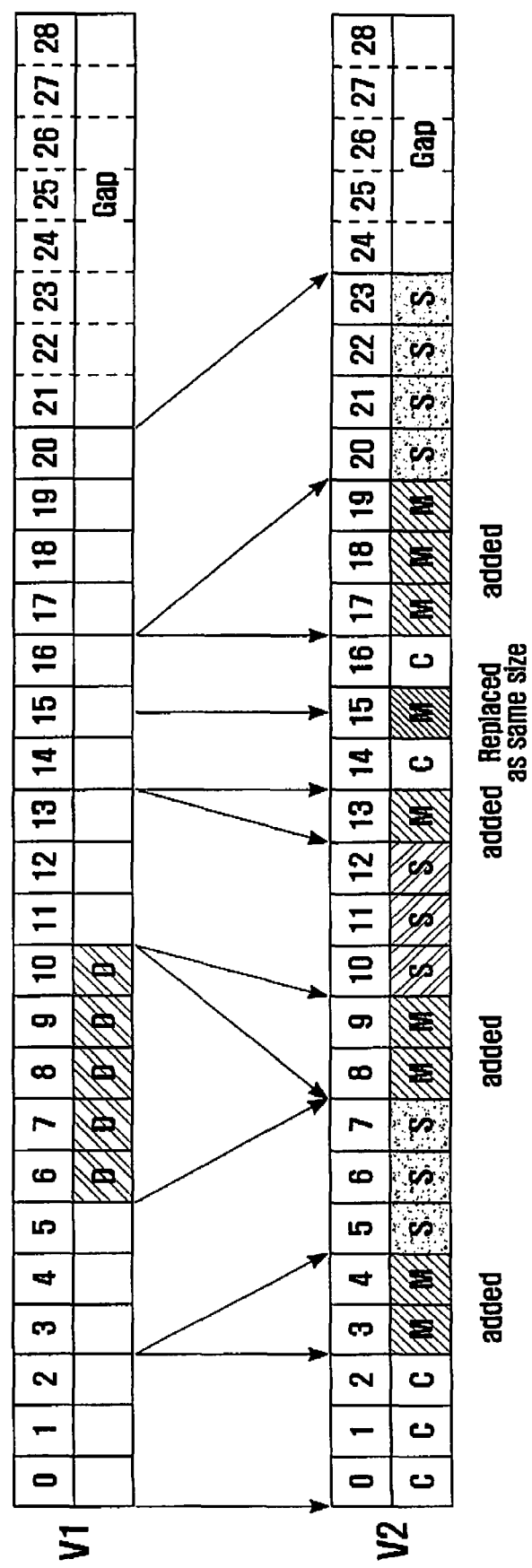
Figure 4E:
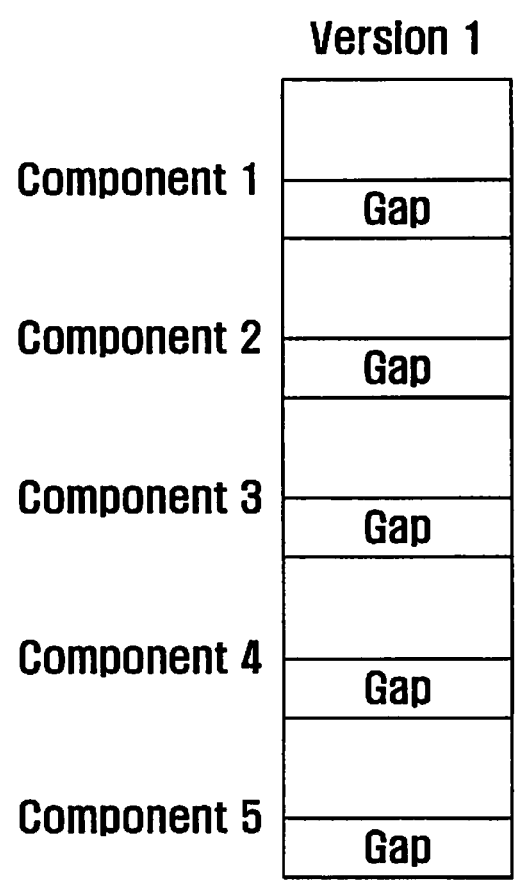

FIG. 4D shows an example of an improved upgrade package generation technique by proving a gap region in V1, and FIG. 4E shows an example of an upgrade package generation technique especially when a block of V1 is removed in V2.

Referring to FIG. 4D, if new data are added or some data are removed in V2 in comparison with V1, the upgrade package processor 10 shifts the blocks following the added or removed blocks. If the blocks are left-shifted, the upgrade package processor 10 searches for the block identical with each modified block in the search range of V1. If an identical block is found, the upgrade package processor 10 maps the block index of V1 to the modified block of V2. Conversely, if an identical macroblock is not found, the upgrade package processor 10 performs entropy coding on the modified block data of V2 to generate upgrade data.

While updating V1 to V2, a plurality of shift operations may be performed. V1 can be programmed with a gap region reserved for the shift operations. The gap region can be configured in consideration of the upgrade data for V2. Preferably, the shift operations are performed without affecting a next component using the gap region as shown in FIG. 4D. In the example of FIG. 4D, V2 is programmed by removing the $6^{th}$ to $10^{th}$ blocks of V1, adding the $3^{rd}$, $4^{th}$, $8^{th}$, $9^{th}$, $13^{th}$ and $17^{th}$ to $19^{th}$ blocks to V2, and replacing the $15^{th}$ block. In this case, the 5 blocks are deleted and 8 blocks are added such that last 3 blocks are shifted. Since the last 3 blocks are shifted to the gap region, the next component of V2 can be compared with the corresponding component of V1 without affect of the shift operations.

Referring to FIG. 4E, the Firmware Over-The-Air (FOTA)-capable binary data are provided with gap regions such that the components are protected from each other. The program has the structure of FIG. 4E. That is, V1 has a plurality of components (in FIG. 4E, 5 components), and each component has a gap region. When V2 is introduced as an upgraded program of V1 with additional data blocks, the upgrade package processor 10 performs shift operations with the gap region. That is, the upgrade package processor 10 performs the upgrade process by component unit such that the upgrade package can be generated per component.

As described above, the upgrade package is generated with the history data, map data, and upgrade data. In this case, the map data includes the attributes (copy, modify, and shift) of the blocks with block indexes, and the upgrade data represents the modified blocks. Also, the upgrade package is generated with the map data and history data but not the upgrade data. In this case, the map data can include the information on the modified blocks in addition to the attributes of the blocks and their indexes.

After the map data are generated in the above manner, the package generator 130 (FIG. 2) generates the upgrade package by analyzing the block data of the second version output by the first compressor 160 and the map data output by the map data generator 150. At this time, the package generator 130 determines whether to generate the upgrade data on the basis of the map data output by the map data generator. That is, the package generator 130 does not generate the upgrade data when the map data contains C and S command strings. Also, in the case that the map data contains M command string and the map data include the data of the corresponding block or indexes of the blocks of the first version, the package generator does not generate the upgrade data. Conversely, if the map data has an M command string including indexes of the modified blocks or entropy coded data, the package generator 130 sets the blocks of the second version as the upgrade data. That is, the package generator 130 does not generate for the blocks following the commands C and S, but generates for the blocks listed in the M command string of which flag is set to F=2.

The upgrade package is transmitted to the upgrade package server 20 after being compressed by the second compressor 140. When the first and second versions are compressed at the first compressor 160, the first decompressor 165 decompresses the compressed first and second version for verifying the compressions of the first and second versions. If an error is detected while the verification process, the first and second version can be recompressed. When the upgrade package is compressed, the second decompressor 145 decompresses the compressed upgrade package to verify normal compression.

The first compressor 160 can be omitted. In this case, the first and second program generators 50 and 55 input the data of the first and second versions to the comparator 110 by in block units such that the comparator 110 compares the first and second versions in unit of the block. When the data of the first and second version are processed in the compressed state, the second compressor 140 can be omitted for reducing the processing delay. In this embodiment, both the first and second compressor 160 and 140 are used.

Also, the upgrade package processor 10 can be configured to produce the upgrade package without map data, with the map data generated at the recipient devices. Also, the package generator 130 can generate the upgrade data together with the commands and block indexes following the commands in association with the blocks of the first version. Accordingly, the map data generator 150 can be omitted in the install data generator 180.

Referring to FIG. 3, the install data generator 180 is implemented without the map data generator 150, unlike FIG. 2. In this case, the package generator 130 generates the upgrade data including the block indexes of the first version mapped to the corresponding block indexes of the second version and information on the block data.

Figure 4F:
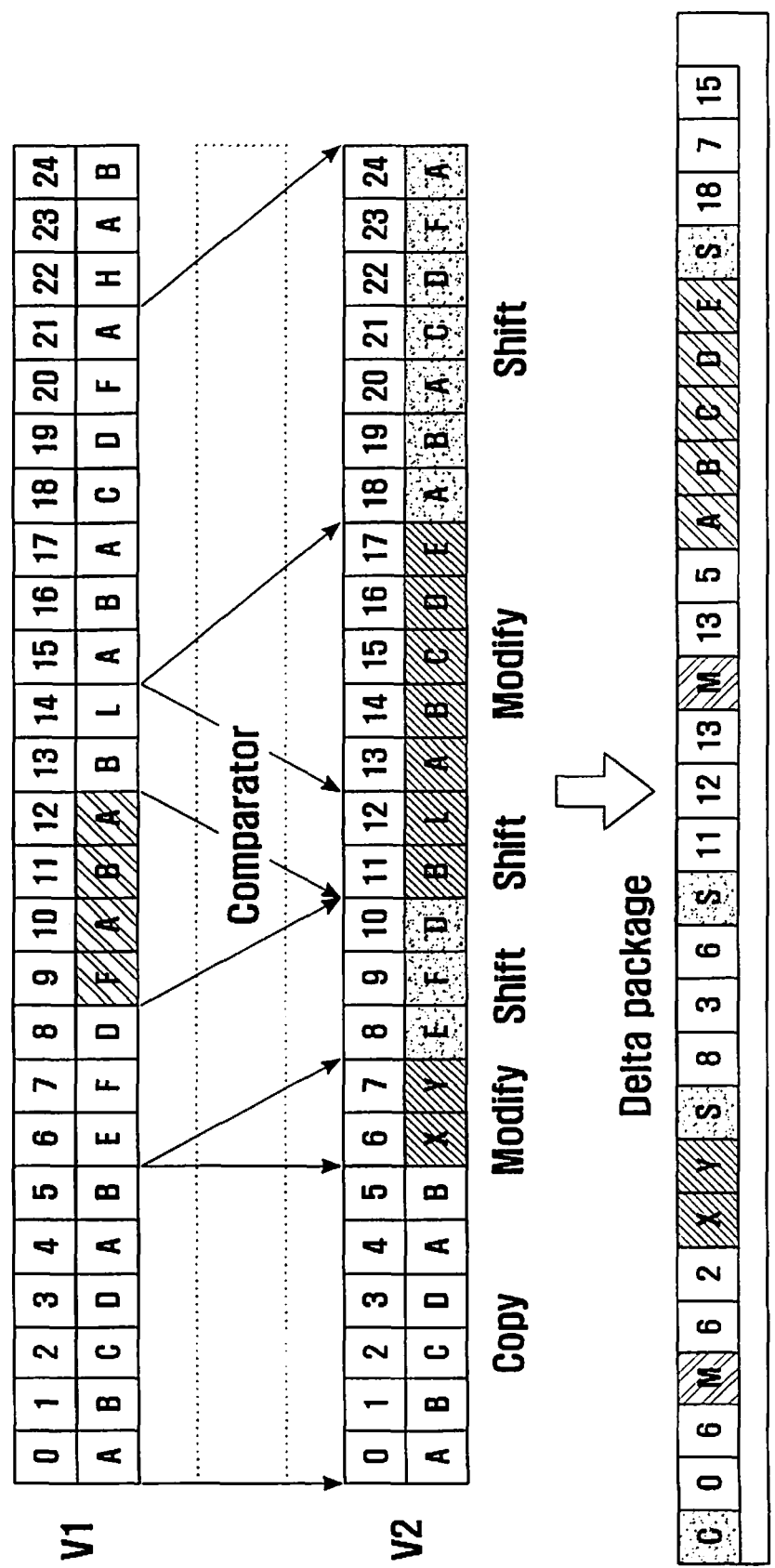

FIG. 4F shows an example of the upgrade package generation only with the history data and the upgrade data. In this case, the upgrade package generator is not provided with the map data generator, and the package generates the upgrade data as shown in FIG. 4F. The upgrade data is preferably composed of indexes of the blocks of V2 and information on the blocks.

Referring to FIG. 4F, V2 is programmed by adding new $6^{th}$ and $7^{th}$ blocks between the $5^{th}$ and $6^{th}$ blocks of V1, adding new $13^{th}$ to $17^{th}$ blocks between the $14^{th}$ and $15^{th}$ blocks of V1, and removing the $9^{th}$ to $12^{th}$ blocks of V1. In this case, the upgrade package processor 10 incorporates the block indexes and information on the block data into the upgrade package. The upgrade data has a structure similar to that of the map data. That is, the upgrade data include the command strings starting with one of command of a C (copy), M (modify, insert or replace as same size) and S (shift), and structured in the following string formats.

Copy Command String Format
[cmd][start block No][number of block]
Modify Command String Format
[cmd][start block No][number of block][data]
Shift Command String Format
[cmd][start block No][number of block][previous version position]

The copy command string includes a start block index and a number of the blocks to be copied; the modify command string includes a start block index and concatenation information of the blocks; and the shift command string includes a start block index and a corresponding block index of the V1.

In the example providing in FIG. 4F, the upgrade information for indicating the blocks to be copied to V2 can be expressed by "C:0,6": the upgrade information for indicating the blocks to be modified can be expressed by "M:6,2,X,Y" and "M:13,5, A,B,C,D,E"; and the upgrade inform for indicating the blocks to be shifted can be expressed by "S:8,3,6, S:11,2,13" and "S:18,7,15." When the upgrade package is generated as shown in FIG. 3F, the recipient device receives the upgrade package, copies the $0^{th}$ to $5^{th}$ blocks of V2 from V1, adds the X and Y for the $6^{th}$ and $7^{th}$ blocks, shifts the $6^{th}$ to $8^{th}$ blocks of V1 for $8^{th}$ to $10^{th}$ blocks of V2, discards the $9^{th}$ to $12^{th}$ blocks of V1, shifts the $13^{th}$ and $14^{th}$ blocks of V1 for the $11^{th}$ and $12^{th}$ blocks of V2, adds the A, B, C, D, and E for the $13^{th}$ to $17^{th}$ blocks of V2, and shifts the $15^{th}$ to $21^{st}$ blocks of V1 for $18^{th}$ to $24^{th}$ blocks of V2. The upgrade data of the upgrade package (delta package) generated by the upgrade package processor 10 can be expressed as shown in Table 5.

TABLE 5

C: 0, 6
M: 6, 2, X, Y
S: 8, 3, 6
S: 11, 2, 13
M: 13, 5, A, B, C, D, E
S: 18, 7, 15

The upgrade package processor 10 generates the upgrade package by combining the upgrade data and the history data and transports the upgrade package to the upgrade package server 20. At this time, the upgrade package generated by the upgrade package processor 10 is compressed before the upgrade package server 20. By generating the upgrade package using the upgrade data without map data, the upgrade package generation speed can be improved. The upgrade package can be generated without compression process.

Figure 5A:
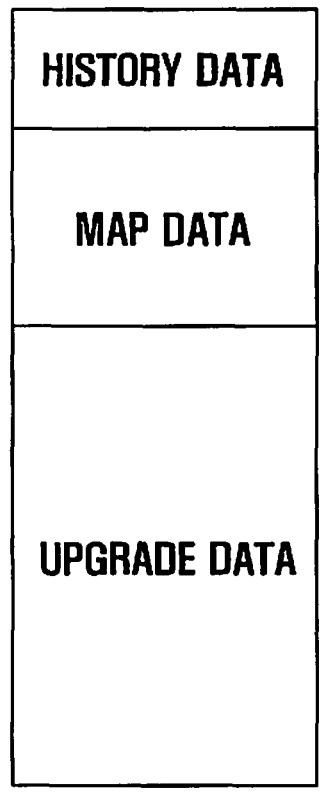
FIG. 5A is a diagram illustrating a data format of an upgrade package generated by the upgrade package processor of FIG. 2.
Figure 5B:
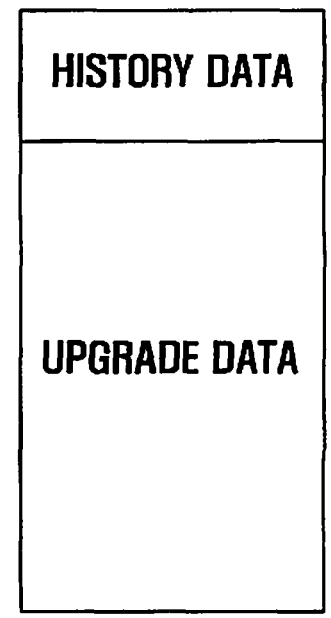
FIG. 5B is a diagram illustrating a data format of an upgrade package generated by the upgrade package processor of FIG. 3.

As described above, the upgrade package processor 10 compares the data of the second version to the corresponding data of the first version and generates an upgrade package with or without install data depending on the comparison result. If the second version is programmed such that some data blocks are removed from or added to the first version, the original data blocks are shifted. When some blocks are removed, the blocks following the removed blocks are left-shifted. In contrast, if some blocks are added, the blocks occupied positions at which the new blocks are added are right-shifted. When the second version includes modified blocks, the upgrade package processor 10 searches for blocks identical with the modified blocks in a search range of the first version, and matches the block indexes of searched blocks in V1 to the block indexes of the modified blocks in V2 or performs entropy coding on the basis of similarities of some series of blocks, depending on the search result. The blocks of V1 replaced by the modified blocks are right-shifted in V2 by the number of the modified blocks. The upgrade package processor 10 produces map data having a command filed set to C (copy), M (modify), and S (shift) on the basis of the comparison result and generates an upgrade package composed of the map data, history data, and upgrade data. The map data can be incorporated into the upgrade data. The upgrade package is transmitted to the upgrade package server 20 through a wired or wireless communication channel. FIG. 5A is a diagram illustrating a data format of an upgrade package generated by the upgrade package processor of FIG. 2, and FIG. 5B is a diagram illustrating a data format of an upgrade package generated by the upgrade package processor of FIG. 3.

The upgrade package processor 10 transmits the upgrade package the upgrade package server 20 through a wireless or wired channel. If an upgrade package is received from the upgrade package processor 10, the upgrade package server 20 notifies the recipient devices 30 of an issuance of a new upgrade package such that the recipients 20 can download the upgrade package from the upgrade package server 20. In order to notify the issuance of an upgrade package, a notification server 25 can be separately provided.

Figure 6:
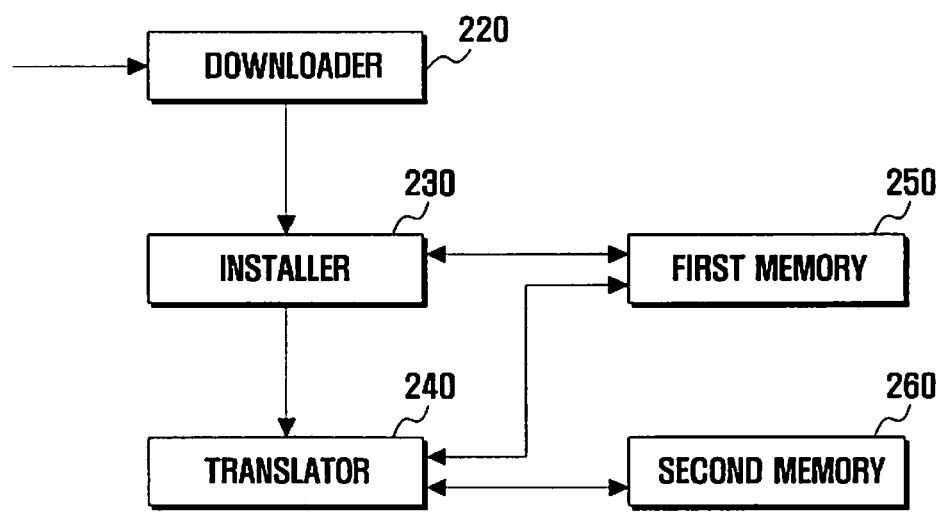
FIG. 6 is a block diagram illustrating a configuration of recipient device of a program upgrade system according to an exemplary embodiment of the present invention.

If an upgrade notification message is received from the upgrade package server 20, the recipient device 30 triggers a download of the upgrade package by responding to the upgrade notification message. FIG. 6 is a block diagram illustrating a configuration of a recipient device of a program upgrade system according to an exemplary embodiment of the present invention.

Referring to FIG. 6, the recipient device 30 includes a download 220, an installer 230, a translator 240, a first memory 250 and a second memory 260. The downloader 220 downloads the upgrade package downloaded from the upgrade package server 20 and temporarily stores the upgrade package within a memory. The memory is preferably a volatile memory as the second memory for storing the upgrade package until being installed. The installer 230 extracts install data and upgrade data and stores the extracted install data and upgrade data into the first memory 250. The install data is preferably composed of history data and map data. However, the install data may include only the history data. When the install data does not have any map data, block mapping information can be contained in the upgrade data. If the install data lacking map data is received, the installer 230 performs a comparison analysis on the first version and the upgrade data and generates map data or not depending on the analysis result. When map data is not generated by the installer 230, the translator 240 merges the upgrade package and the first version of the program using the mapping information contained in the upgrade data. The installer 230 stores the history data, map data, and upgrade data within a region of the first memory 250 prepared for the upgrade package. The first memory 250 stores the first version of the program and at least one upgrade package for updating the first version to the second version of the program. A number of the upgrade packages that can be stored in the first memory 250 N is preferably preset. In this embodiment, N is set to 6.

If an upgrade package for a new version of the program is downloaded, the recipient device 30 outputs an alert for notifying the user that a program upgrade is prepared. At this time, the translator 240 reads out the data of the first version of the program and the upgrade package for the second version, and merges the data of the first version and the upgrade package so as to produces the second version. The second version of the program is loaded on the second memory 260. At this time, the translator 240 analyzes the install data of the upgrade package to check a version number and a target version to be upgraded. Also, the translator 240 analyses the map data and upgrades the data of the blocks of the target version (in this embodiment, the first version) with corresponding upgrade data with reference to the map data. When the install data does not have any map data, the translator 240 analyzes the history data and determines a target version of the program to be upgraded on the basis of the history data analysis result. The second version can be generated by merging the upgrade data of the upgrade package and the first version. The translator 240 loads the data of the second version on the second memory 260 while the first version is upgraded to the second version. After completing the upgrade process, the recipient device 30 operates with the second version of the program loaded on the second memory 260.

As described above, the first memory 250 stores the first version of the program and at least one upgrade package for updating the first version to the second version. The upgrade package includes install data (history and map data) and upgrade data. The install data can be composed of only history data. Also, the upgrade package can be composed of only the install data. The install data are composed of the map data containing mapping information of the history data and the upgrade data of the upgrade package. The map data provides a relationship between the two versions with three types of commands, i.e. copy, modify, and shift. The map data is used for quick address calculation for updating the data of the first version to the data of the second version. With reference to the data of the first version stored in the first memory 250 and using the map data, the second version of the program can be quickly generated and loaded on the second memory 260.

The install data of the upgrade package can be produced with or without the map data at the upgrade package processor 10. Accordingly, the upgrade package downloaded from the upgrade package server 20 may or may not include the map data. When the upgrade package lacks map data, the installer 230 can produce the map data by comparing the data of the first version stored in the first memory 250 and the upgrade package and analyzing the comparison result for mapping the upgrade data of contained in the upgrade package to the data of the first version. The upgrade data can be structured as shown in FIG. 4F. The reason why the map data are generated by the installer 230 is to increase the second is version generation speed of the translator 240. When the upgrade data contains mapping information for mapping the upgrade data to the data of the first version, the upgrade data can be replaced directly or with reference to map data generated afterward.

Although it is preferred to upgrade the first version with the latest upgrade package, the first version can be upgraded with an upgrade package for another version of the program. This is possible because the recipient device 30 allows storing of six upgrade packages. Accordingly, if the second version generation fails with an upgrade package, it is possible to try to generate the second version using another upgrade package stored in the first memory 250.

The first memory 250 can be implemented with several storage regions for storing upgrade packages, respectively (in this embodiment, six upgrade packages can be stored). Accordingly, even though a new upgrade package is downloaded for the upgrade package server 20, a previously downloaded upgrade package is not deleted. The upgrade records are stored as upgrade history with maintenance of the data for the first version of the program. Since the information on the first and second versions is maintained with the upgrade history, the upgrade can be performed with a high fault tolerance. For example, when the last upgrade package does not work, another upgrade package can be used by user selection. Even in the worst case where all upgrade packages fail to work, the original version of the program can be recovered.

Figure 7:
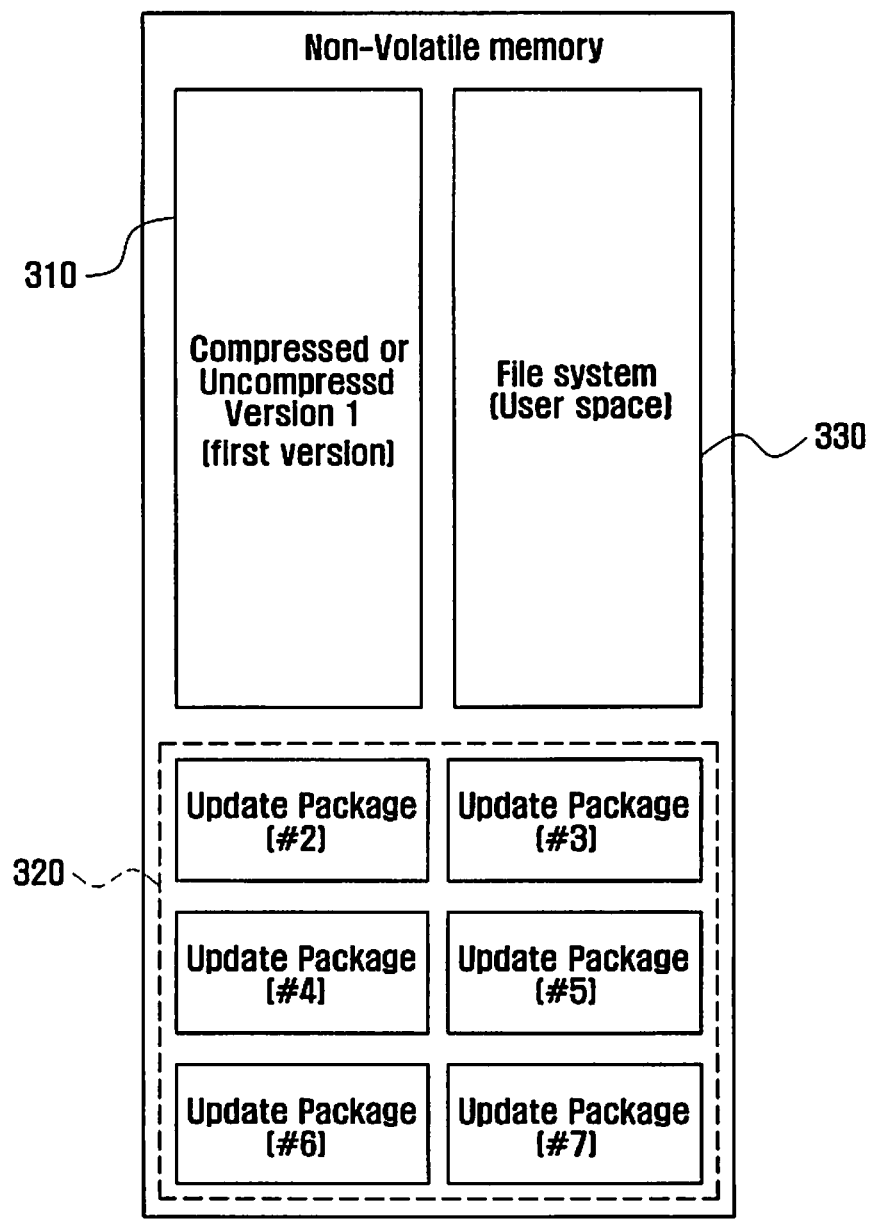
FIG. 7 is a block diagram illustrating a configuration of a first memory of a recipient device of FIG. 6.

FIG. 7 is a block diagram illustrating a configuration of a first memory of the recipient device of FIG. 6. Referring to FIG. 7, the first memory includes a first storage region 310, a second storage region 320, and a third storage region 330.

The first storage region 310 stores the first version of the program in the form or raw data or compressed data. The second storage region 320 stores at least one upgrade package for generating a new version of the program. Each upgrade package includes the upgrade data and install data. The upgrade data preferably includes commands with block indexes for updating the data of an old version, or data to the added for the new version. Accordingly, the size of the second storage region 320 is determined on a number of the upgrade packages stored therein. The third storage region 330 is a user space for storing user data with a file system.

Figure 8A:
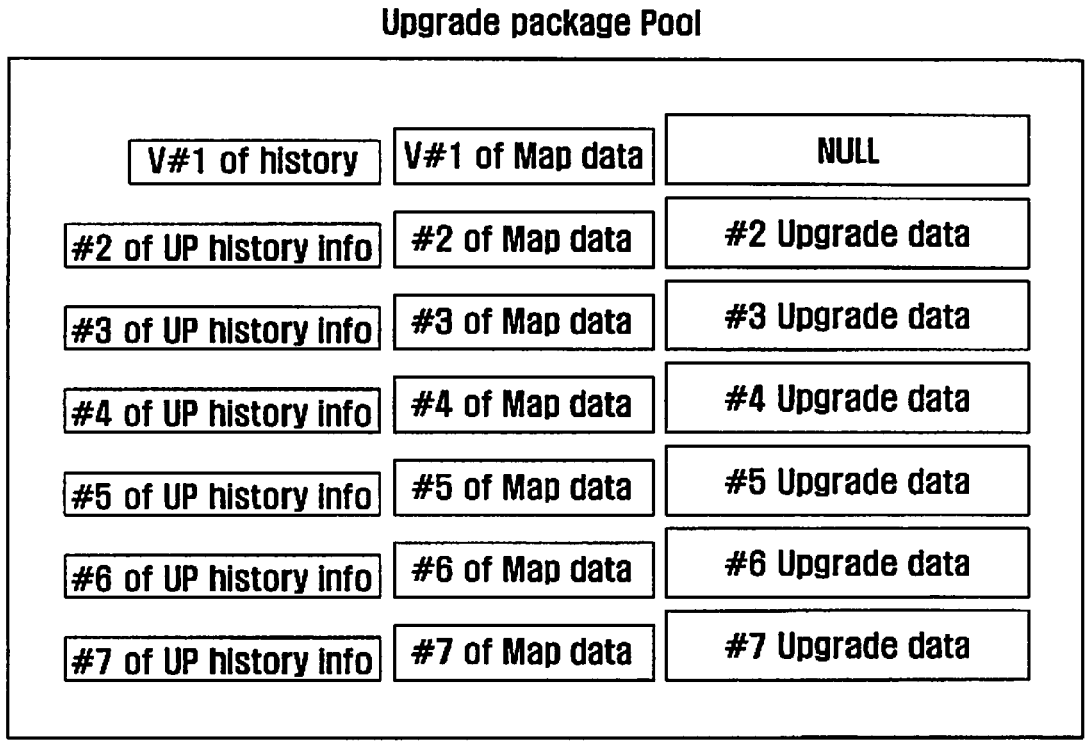
FIG. 8A is a diagram illustrating a structure of the second storage region of the first memory of FIG. 7.
Figure 8B:
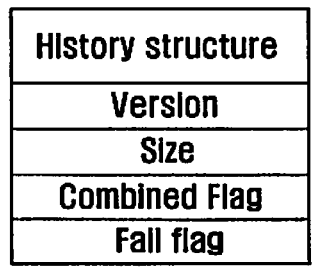
FIG. 8B is a diagram illustrating a data format of the history data of each upgrade package stored in the second storage region of FIG. 8A.

FIG. 7 is a diagram illustrating a structure of the second storage region of the first memory 250 of FIG. 6, and FIG. 8B is a diagram illustrating a data format of the history data of each upgrade package stored in the second storage region of FIG. 7.

Referring to FIG. 7, the second storage region 320 is provided with a predetermined number of storage regions for storing the upgrade packages (in this embodiment, 6 upgrade packages). Each storage region is structured to store history data, map data, and upgrade data constituting the upgrade package. Typically, the upgrade package includes install data and upgrade data, and the install data includes history data or history and map data. The second storage region 320 is preferably configured to separately store the history data and map data. The history data are stored for maintaining a link to the first version stored within the first storage region 310. The map data and upgrade data of the first version may not be stored or exists as null data. FIG. 8A provides an example of the upgrade package composed of the history data, map data, and upgrade data. When the upgrade package processor 10 generates the upgrade package with the history data and the map data, the second storage region 320 is preferably structured with the storage regions for storing the history data and map data of corresponding version.

Referring to FIG. 8B, the history data includes a version field, a size field, a combined flag field, and a fail flag field. Here, the version field contains a version number of the upgrade package (one of #2 to #7 in FIG. 8A), the size field contains a size value of the history data, the combined flag field contains a version number of a target version to be upgraded (in this example, the version number #1 of the first version), and the fail flag field contains information on the occurrence of loading failure. The version number #1 of the first version is preferably contained in the version field and linked to the combined flag field. For example, if a version field and combined flag field of the history data of an upgrade package, respectively, contain #5 and #1, the recipient device 30 upgrades the first version of #1 by merging the second version of #5 and the first version of #1. The downloaded upgrade package is stored into the second storage region 320 of the first memory 310 shown as shown in FIG. 7 in the structure of FIG. 8A. When an upgrade package stored in the second storage region 320 is requested, the requested package is merged with the first version stored in the first storage region 310 such that the first version is upgraded to the second version.

An upgrade operation of a program upgrade system that is described herein includes the upgrade package includes map data, history data, and upgrade data.

Figure 9:
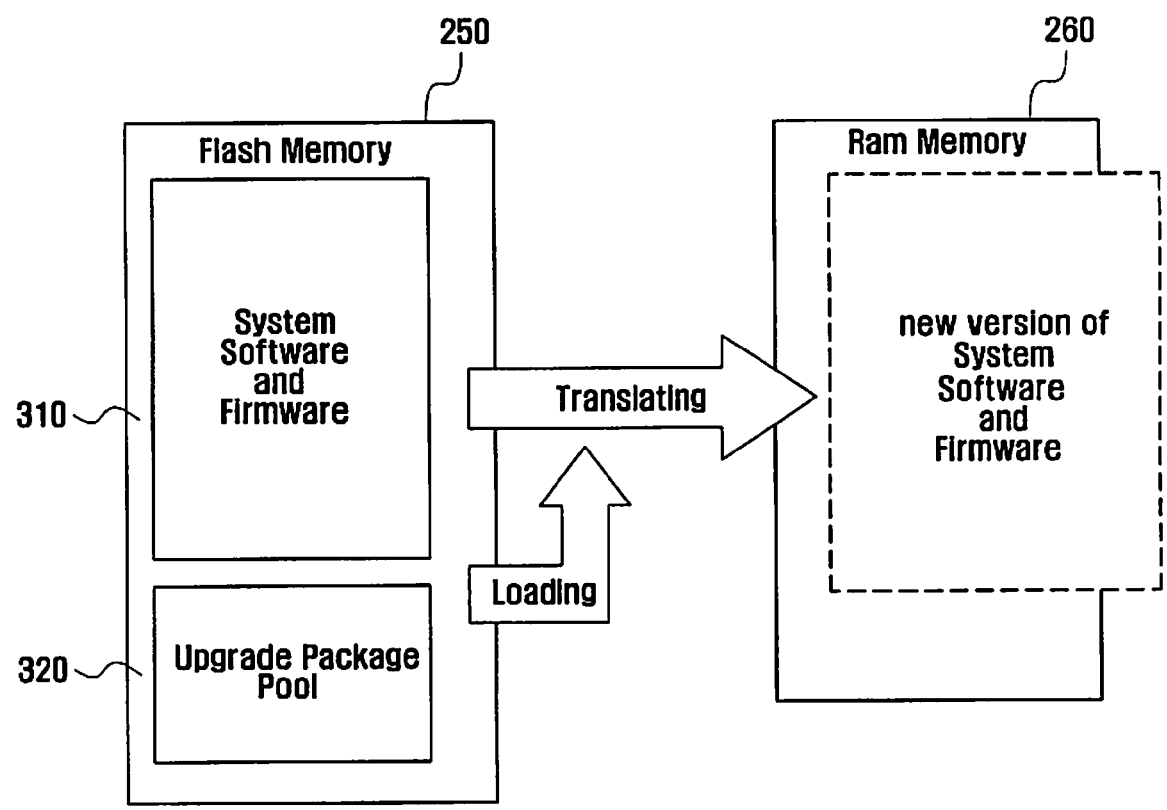
FIG. 9 is a block diagram illustrating an upgrade operation of a program upgrade system according to an exemplary embodiment of the present invention.

FIG. 9 is a block diagram illustrating an upgrade operation of a program upgrade system according to an exemplary embodiment of the present invention. As shown in FIG. 9, the first memory is a nonvolatile memory such as flash memory, and the second memory is a volatile memory such as a Random Access Memory (RAM).

Referring to FIG. 9, if an upgrade request is input, a loader (not shown) loads an upgrade package of the requested version from the second storage region 320 of the first (flash) memory 250, and the translator 240 generates a second version of the program by merging the loaded upgrade package and the first version of the program stored in the first storage region 310 and then loads the second version on the second memory 260. The upgrade request is generated in response to a user command. That is, the recipient device 30 outputs an alert for notifying the user of an issuance of an upgrade package when an upgrade package is downloaded or there exists a downloaded package which is not applied such that the user can trigger to upgrade the target program. If the upgrade request is input by the user in response to the upgrade alert, the recipient device 30 performs an upgrade process as described above and loads the upgraded version of the program on the second memory 260. Accordingly, the recipient device 30 operates with the second version afterward.

The upgrade process is preferably performed after the recipient device is initialized. As shown in FIG. 6, the first version and upgrade packages of the program are separately stored in the first memory 250 and the program upgrade is performed by merging the first version and one of the upgrade packages such that the second version of the program is generated and loaded on the second memory 260.

Figure 10:
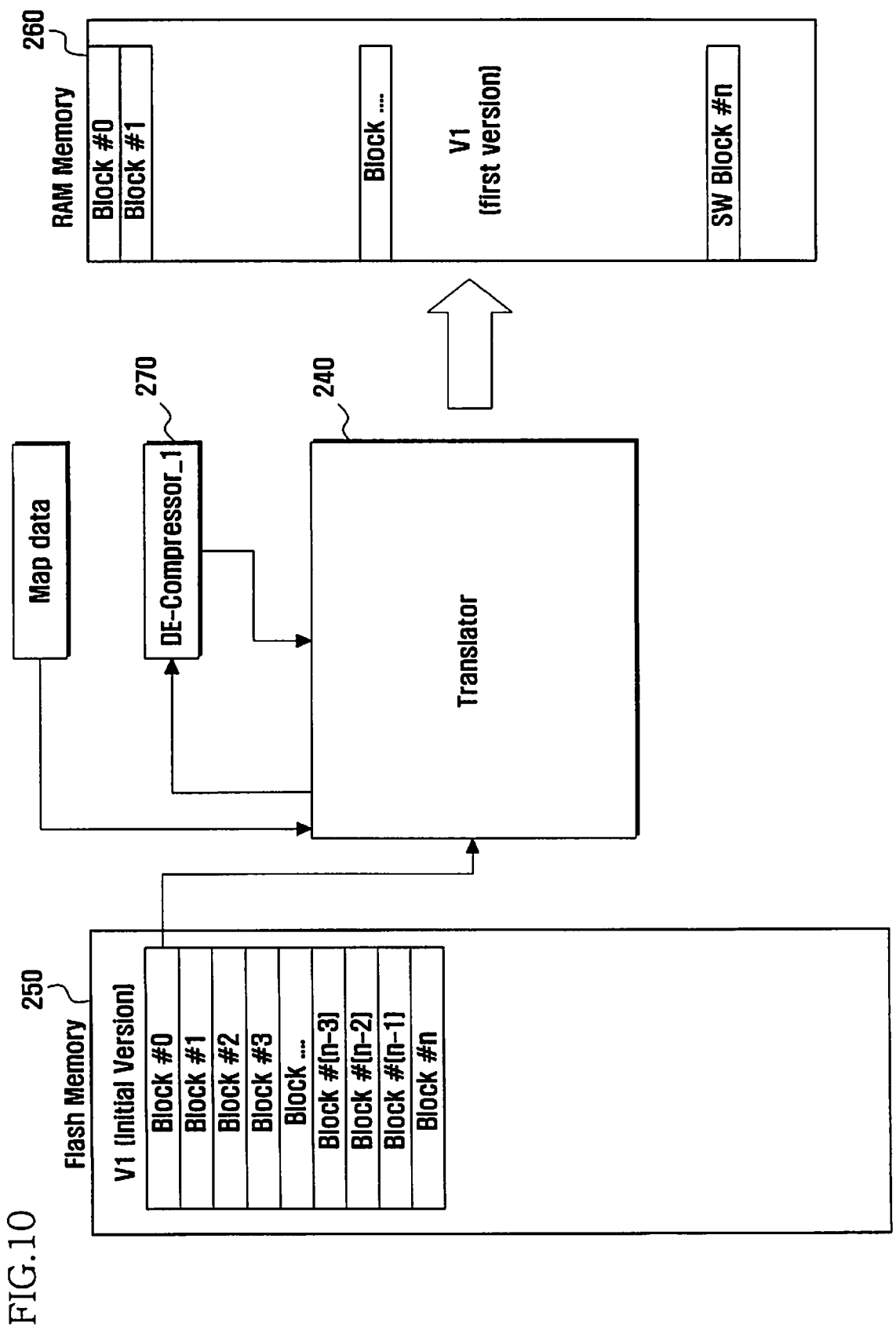
FIG. 10 is a block diagram illustrating an upgrade operation of a program upgrade system according to another exemplary embodiment of the present invention.
Figure 11A:
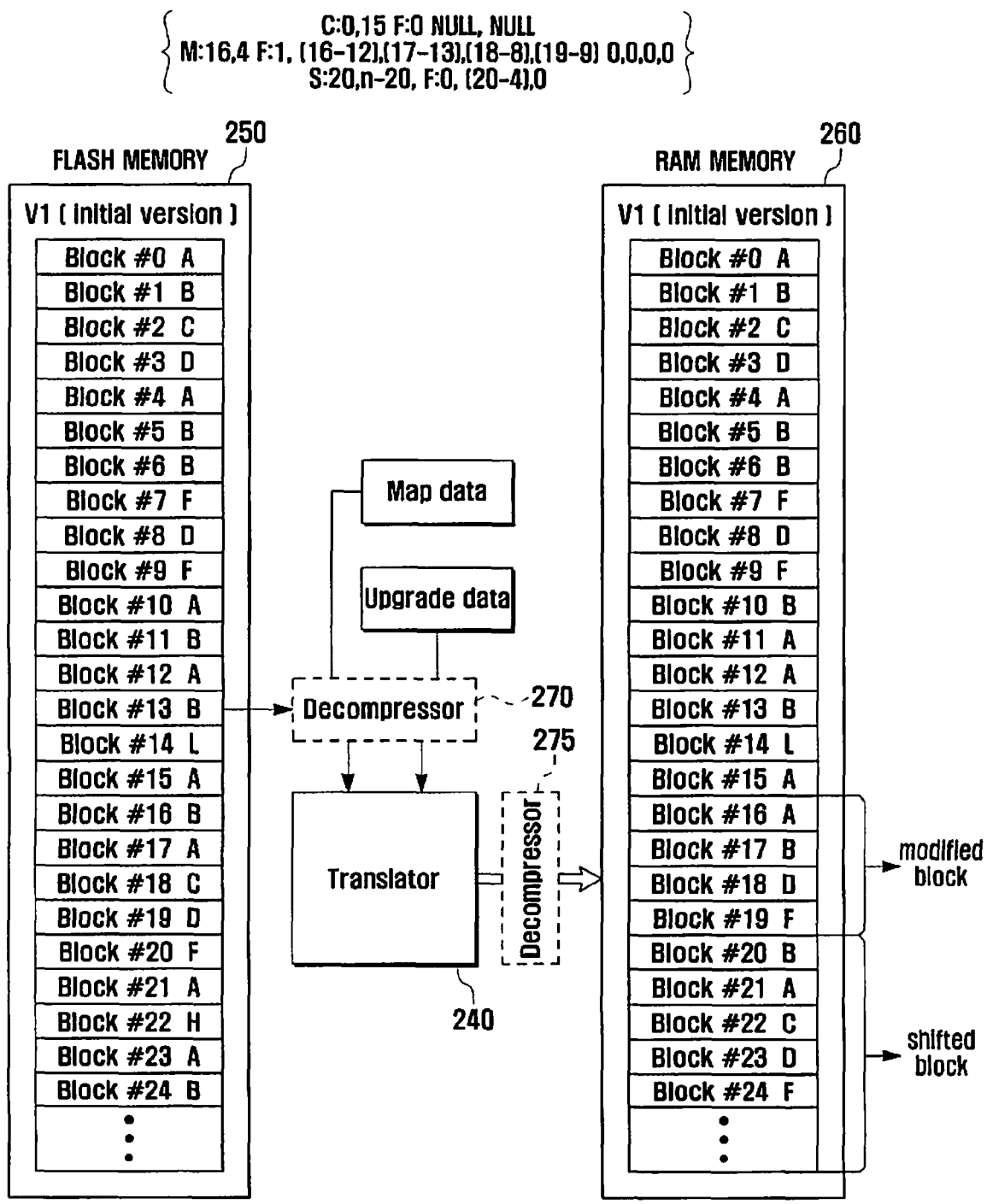
FIGS. 11A and 11B are block diagrams illustrating an upgrade operation of a program upgrade system according to another exemplary embodiment of the present invention.
Figure 11B:
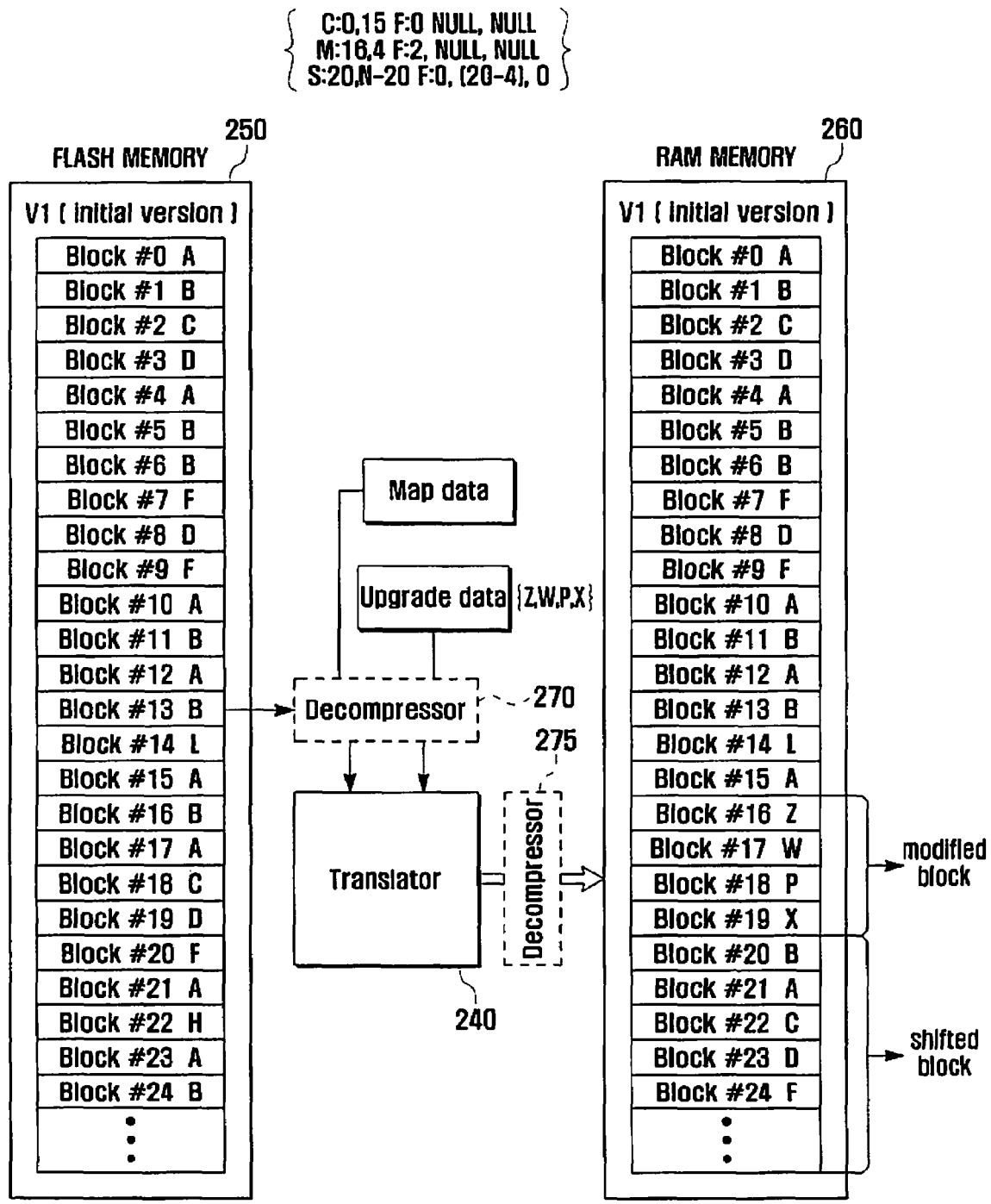

FIG. 10 is a block diagram illustrating an upgrade operation of a program upgrade system according to another exemplary embodiment of the present invention. In this embodiment, the first memory 250 does not stores an upgrade package for the second version. FIGS. 11A and 11B are block diagrams illustrating an upgrade operation of a program upgrade system according to another exemplary embodiment of the present invention.

Referring to FIG. 10, the first memory 250 stores the first version of the program. Here, the first version can be an initial version of the program. The first version of the program is composed of n blocks B#1 to B#n. The install data of the first version include history data and map data. The history data has a version field set to #1 and a combined flag filed set to #0. The map data is preferably structured in the form of one of Tables 1 to 3 described above.

If an upgrade request command is input, the translator 240 analyzes the install data. When a upgrade package does not exist in the first memory 250, a map data region is in null state or provided with map data {C:0,n, F:0, null, null}. Such map data implies a command to load the first version of the program stored in the first memory 250 on the second memory, whereby the translator 240 copies the first version from the first memory 250 and loads the copied first version on the second memory 260. Accordingly, the recipient device 30 is operated by the first version loaded on the second memory 260. The first version is preferably stored in the first memory 250 in a compressed state. In this case, the translator 240 decompresses the compressed first version using the decompressor 270 and then loads on the second memory 260. Also, when an upgrade package compressed by the second compressor 140 of the upgrade package processor 10 is downloaded, the translator 240 performs translation after the compressed upgrade package is decompressed by the decompressor 270 before loading on the second memory 260. When the upgrade package is compressed by the second compressor 140, the translator 240 performs translating after compressed upgrade package is decompressed.

FIGS. 11A and 11B are block diagram illustrating an upgrade operation of a program upgrade system according to another exemplary embodiment of the present invention. In this embodiment, the first version is stored in the first storage region 310 of the first memory 250 and the upgrade packages of the second version are stored in the second storage region 320 of the first memory 250. The first version can be an initial version or a preset reference version, and each upgrade package includes upgrade data and install data. The install data include history data containing version numbers of the second version and a target version to be upgraded (in the example, the first version), and map data. The first version is composed of n blocks B#1 to B#n, as in FIGS. 11A and 11B. The combined flag field of the history data is set to #0 and the map data is preferably structured in the form of one of Tables 1 to 3.

Referring to FIG. 11A, the first storage region 310 (FIG. 7) of the first memory 250 stores the first version of the program, and a specific upgrade package stored in the second storage region 320 of the first memory 250 has the map data in the form of Table 1. The history data of the upgrade package has a flag for merging the upgrade package with the first version. In this case, the translator 240 upgrades the first version to the second version with reference to the map data and loads the second version on the second memory 260. The map data have information for copying the $0^{th}$ to $15^{th}$ blocks of the first version; copying the $12^{th}$, $13^{th}$, $8^{th}$, and $9^{th}$ of the first version for the $15^{th}$ to $19^{th}$ blocks of the second version; and right-shifting the blocks following the $15^{th}$ block of the first version. Accordingly, the translator 240 upgrades the first version with reference to the map data and loads the upgraded program, i.e. the second version, on the second memory 260 as shown in FIG. 11A.

Referring to FIG. 11B, the first storage region 310 of the first memory 250 stores the first version of the program, and the second storage region 320 of the first memory 250 stores the upgrade packages, with a specific upgrade package having the map data structured in the form of Table 3. The history data of the upgrade package has a flag for informing of merge of the first version and the upgrade package. The map data have information for copying the $0^{th}$ to $15^{th}$ blocks of the first version; inserting the upgrade data {Z,W,P,X} for the $16^{th}$ to $19^{th}$ blocks of the second version; and right-shifting the blocks following the $15^{th}$ block of the first version. In this manner, the translator 240 upgrades the first version with reference to the map data.

After the program is upgraded, the recipient device 30 is operated by the second version of the program that is upgraded in accordance with the examples of FIGS. 11A and 11B. The first version and the upgrade packages can be stored in compressed states. The upgrade packages are preferably downloaded as a compressed package or compressed after being downloaded. When the first version and the upgrade packages are stored in the compressed states, the translator 240 decompresses the compressed first version and the upgrade packages using the decompressor 270 for use in an upgrade process. When the first and second versions are compared in the compressed states (when the first and second versions are compressed by the first compressor 160 of the upgrade package processor 10), the blocks input to the translator 240 can be in compressed states. In this case, the translator 240 decompresses the compressed data of the first version and the upgrade package using the decompressor 275 and loads the decompressed data on the second memory 260.

Figure 12:
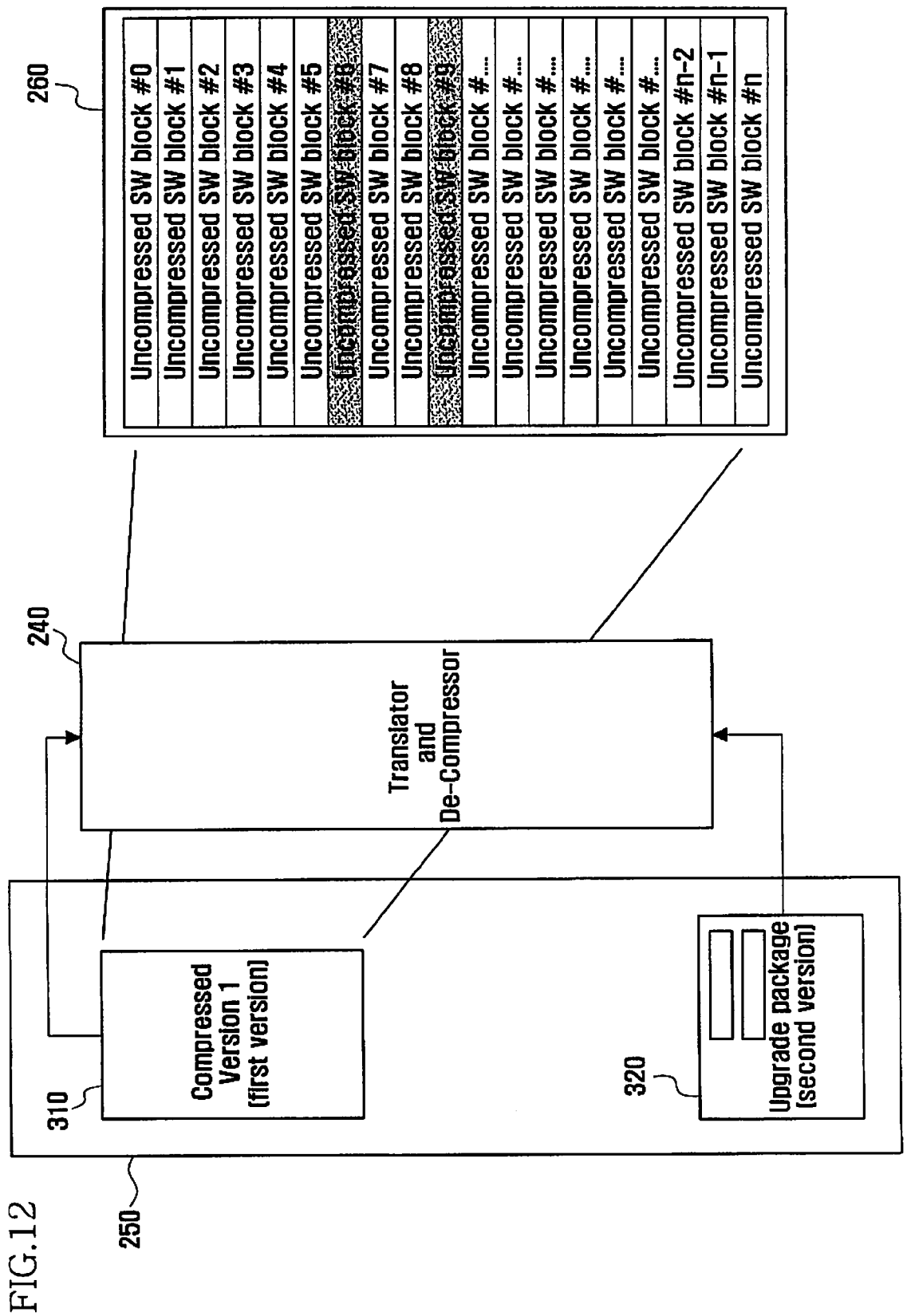
FIG. 12 is a block diagram illustrating an upgrade operation of the recipient device of the program upgrade system according to an exemplary embodiment of the present invention.

FIG. 12 is a block diagram illustrating an upgrade operation of the recipient device of the program upgrade system according to an exemplary embodiment of the present invention. Referring to FIG. 12, the first memory 250 stores the first version of the program and upgrade packages for the second version. The translator 240 merges an upgrade package and the first version in response to an upgrade command such that the second version is generated and loaded in the second memory 260. After the second version of the program is loaded in the second memory 260, the recipient device 30 is operated by the second version of the program. The upgrade process is preferably repeatedly performed when the recipient device 30 is initialized or an upgrade command is input.

As described above, the program upgrade method according to an embodiment of the present invention downloads an upgrade package through a predetermined communication standard channel, stores the downloaded upgrade package, performs upgrade of the program using the stored upgrade package, loads the upgraded program, and operates the recipient device under the control of the upgraded program. The program upgrade method of the present invention can be composed of an upgrade package generation procedure, downloaded install data processing procedure, downloaded upgrade package management procedure, and upgrade execution procedure.

In the upgrade package generation procedure, the first and second versions of the program are input to the upgrade package processor 10. The first and second versions can be input in a raw or in a compressed state. Next, the first and second versions are compared such that differences between the two versions are checked. On the basis of the differences, install data including map data for merging the upgrade package with the first version installed in the recipient device are generated. The install data are packed into an upgrade package together with upgrade data, and the upgrade package is transmitted to the upgrade package server.

In the downloaded install data processing procedure, the upgrade package transmitted to the upgrade package server is downloaded to a recipient device. The recipient device can obtain the install data contained in the upgrade package by comparing the upgrade package with a reference version (here, the first version), and the install data facilitate address calculation. That is, when merging the first version stored in the first memory 250 and the upgrade package in the second memory 260, the data of the first version and upgrade package can be quickly processed by block using the install data.

In the upgrade package management procedure, the install data are used for fast address calculation referring to the map data that are obtained by comparing the upgrade package and the first version, and facilitating merging of the first version and the upgrade package in the second memory 260. The upgrade package installation is preferably performed depending on whether the map data is packed in the upgrade package. When the map data is packed in the upgrade package, the recipient device 30 extracts the history data, map data, and upgrade data from the upgrade package and the stores the extracted data in the upgrade package regions of the first memory 250, independently. On the other hand, if map data is not contained in the upgrade package, the recipient device 30 can obtain the map data by comparing the first version stored in the first memory 250 and the downloaded upgrade package. At this time, the map data can be integrated into the upgrade data as shown in FIG. 3F. In this case, the recipient device extracts the map data from the upgrade data during the install process and install the map data in a map data region. The recipient device also extracts the upgrade data and installs the upgrade package storage region. Accordingly, the recipient device can install the upgrade package in the same manner as the map data are packed in the upgrade package. The install data also includes history data of the upgrade package. The history data informs the versions of the upgrade packages and the target program. In this embodiment, six upgrade packages can be stored in the first memory 250. When a merge failure occurs with a specific upgrade package, the recipient device allows the user to select another upgrade package by displaying an upgrade package list.

In the upgrade execution procedure, the upgrade packages are stored in corresponding storage regions prepared in the first memory 250. Accordingly, when a new upgrade package is downloaded, the previously downloaded upgrade package is not erased. Accordingly, when a specific upgrade package is not loaded, the recipient device 30 allows the user to select another upgrade package for program upgrade by displaying an upgrade package list. Even in the worst cast that all upgrade packages are not loaded, the first version of the program can be loaded.

Figure 13:
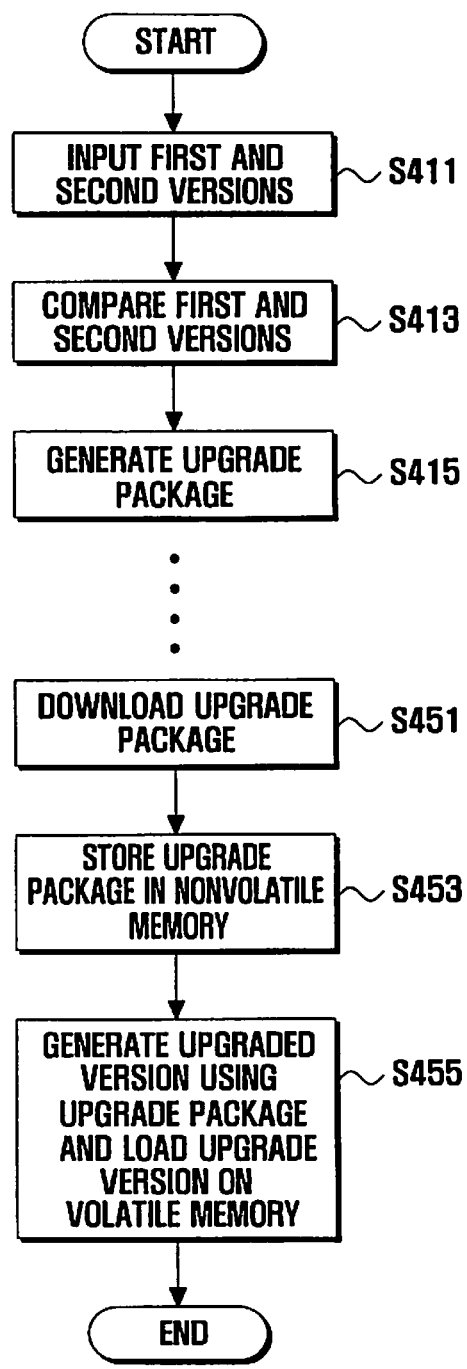
FIG. 13 is a flowchart illustrating a program upgrade method according to an exemplary embodiment of the present invention.

FIG. 13 is a flowchart illustrating a program upgrade method according to an exemplary embodiment of the present invention. The steps of the program upgrade method are depicted in relation with the operations of the upgrade package processor 10 and the recipient device 30 of the program upgrade system of FIG. 1.

Referring to FIG. 13, the upgrade package processor 10 receives the first and second versions of a program in Step 411. An upgrade package is generated, when a new version of the program is introduced, by comparing the old version, i.e. the first version and the new version, i.e. the second version. The upgrade package includes of upgrade data and install data. The first version can be an original version or a reference version that is programmed to be merged with upgraded packages. The upgrade package is an information package for upgrading the first version of the program installed in the recipient device to the second version. The recipient device can store at least one upgrade package. If the first and second versions of the program are received, the upgrade package processor 10 analyses differences between the first and second versions in Step 413, and generates upgrade package on the basis of the analysis result in Step 415. The upgrade package includes upgrade data and install data contained information for combining the upgrade data with the first version. The install data includes history data providing a history of the second version and map data providing information for mapping blocks of the first and second versions of the program. The map data may not be contained in the install data. In this case, the recipient device can generate the map data in the program upgrade process. The install data are provided for facilitating the program upgrade process. If the upgrade package is successfully generated, the upgrade package processor 10 transmits the upgrade package to the upgrade package server 20. Upon receiving the upgrade package, the upgrade package server 20 transmits an upgrade notification message to the recipient device 30. If an upgrade notification message is received, the recipient device 20 starts downloading the upgrade package in response to a user command. The download procedure can be determined on the basis of the communication standard supported by the recipient device 30. The communication standards include CDMA, UMTS, GSM, WiBro, Wi-Fi, WiMAX, Bluetooth®, UWB, Zigbee and USB.

If the upgrade package download is started, the recipient device 30 receives the upgrade package in Step 451 and stores the downloaded upgrade package into the first memory 250. The first memory 250 is provided with the first storage region 310 for storing the first version of the program and a second storage region 320 for storing the upgrade packages. The second storage region 320 can be structured in the form of multiple storage regions for storing corresponding upgrade packages. In this embodiment, the second storage region 320 has six storage regions. Each storage region can separately store the history, map data, and upgrade data.

When the map data is not contained in the install data of the downloaded upgrade package, the installer 230 of the recipient device 30 generates the map data with reference to the upgrade package and the first version of the program. After the upgrade package is stored in the first memory 250, the recipient device 30 upgrades, in response to a user command, the program to the second version by merging the upgrade package and the first version and then loads the second version of the program on the second memory 260 in Step 455. Accordingly, the recipient device 20 is operated under the control of the second version of the program afterward. The second memory 260 can be a work memory as a volatile memory. In such manner, the recipient device 30 generates the second version of the program by merging the first version stored in the first memory 250 and the recently downloaded upgrade package in a system initialization process, and loads the second version on the second memory 260 for controlling operations of the recipient device 30. When the program upgrade fails with a specific upgrade package, the recipient device 30 automatically tries to upgrade the program with another upgrade package stored in the first memory 250. Also, the recipient device 3 allows the user to select an upgrade package by providing an upgrade package list such that the first version is upgraded with selected upgrade package.

A program upgrade process is described hereinafter in more detail, with reference to FIG. 14, in which the recipient device 30 has installed the first version of the program in the first region 310 of the first memory 250 in Step 501. The first version is installed at the manufacturing phase and can be replaced by a reference version downloaded and installed after manufacture. If the issuance of the upgrade package is notified, the recipient device 30 starts downloading the upgrade package from the upgrade package server 20 and temporarily stores the upgrade package in Step 503 to 507. Typically, the upgrade package is installed in a memory so as to be stably accessed. Accordingly, the downloaded upgrade package is installed in the first memory 250. The upgrade package can be installed immediately upon being downloaded or after completing a normal operation. If an install command is not detected after the upgrade package is completely downloaded at Step 509, the recipient device 30 returns to a normal operation mode. If an install command is detected while operating in the normal operation mode, the recipient device starts installing the upgrade package stored in the first memory 250.

If an install command is detected at Step 509, the recipient device 30 starts installing the upgrade package within the first memory 250. The first memory is a nonvolatile memory and includes a first region for storing the first version as the reference version and a plurality of second regions for storing a plurality of upgrade packages. That is, the first memory 250 is provided with the first and second regions for storing the first version and the upgrade packages of the second versions as shown in FIGS. 7, 8A, and 8B. Accordingly, the recipient device 30 installs the downloaded upgrade package within a storage region designated for the upgrade package. The upgrade package is independently stored regardless of previously downloaded upgrade packages in a temporal order of downloaded times in association with the upgrade history.

After the upgrade package is installed in the first memory 250, the recipient device displays an alert and determines whether a system reboot command is input in Step 515. If a system reboot command is not detected, the recipient device 30 returns to the normal operation mode in Step 517. In this case, since the system upgrade is not performed yet, the recipient device 30 operates with the first version of the program.

If a system reboot command is detected, the recipient device 30 performs a system initialization in Step 521 and then loads the translator 240 in Step 523. The translator 240 merges the upgrade package installed in the first memory 250 with the first version so as to generate and load an upgraded version of the program on the second memory 260. After loading the translator 240, the recipient device 30 checks the status of the upgrade package to determine whether the upgrade package is erroneous in Step 525. If the upgrade package is erroneous, the recipient device 30 loads the version (second version) before being upgraded or the first version on the second memory for stable operation in Step 533. If it is determined that the status of the upgrade package is normal at Step 525, the recipient device 30 loads the upgrade package (Step 527) and merges the upgrade package with the first version in Step 529, whereby the second version is generated in Step 531. The second version of the program is loaded on the second memory 260 to operate the recipient device 30.

The recipient device 30 performs installing and translating the downloaded upgrade packages in the above-described manner.

Figure 14:
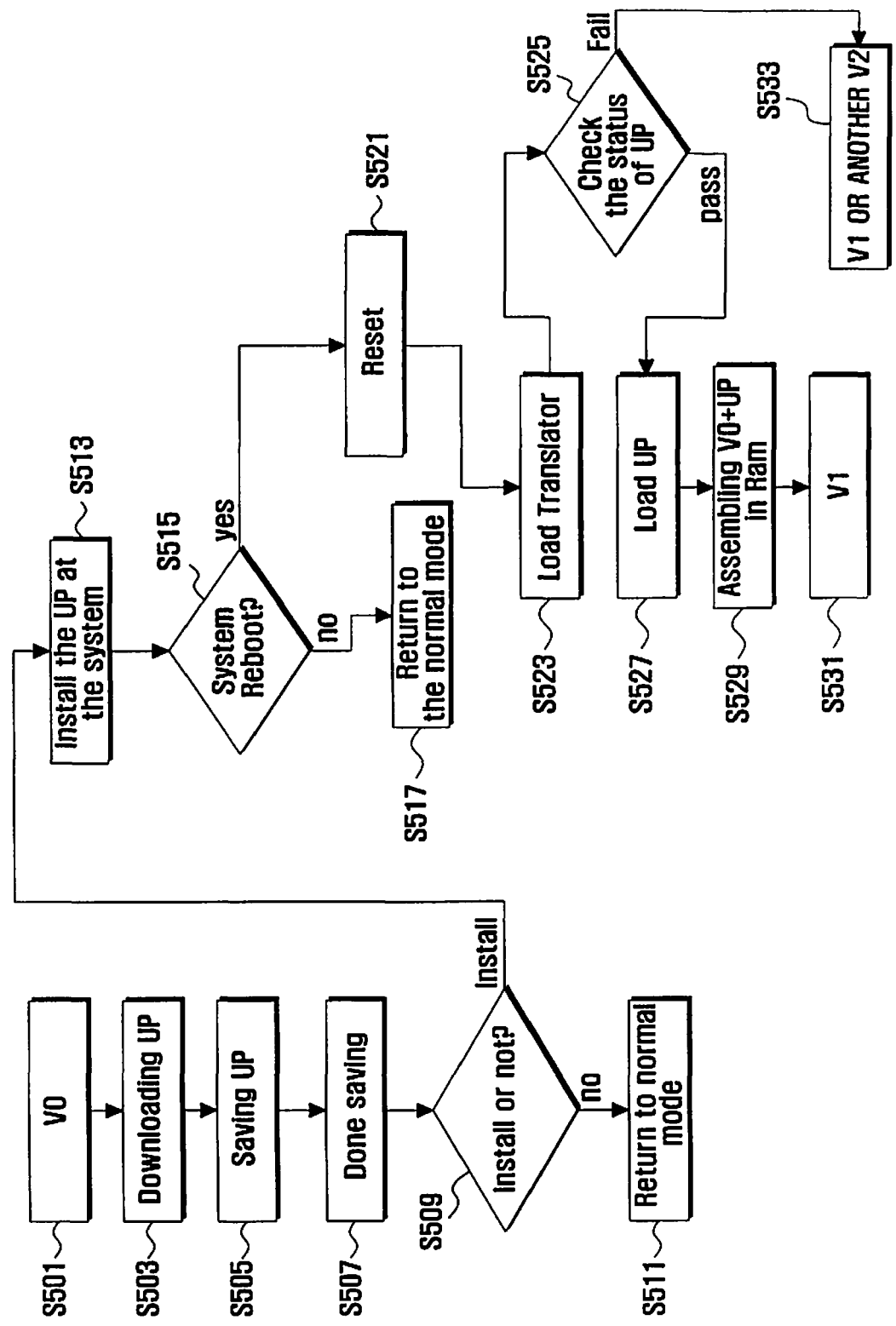
FIG. 14 is a flowchart illustrating a program upgrade method of a recipient device of a program upgrade system according to an exemplary embodiment of the present invention.
Figure 15:
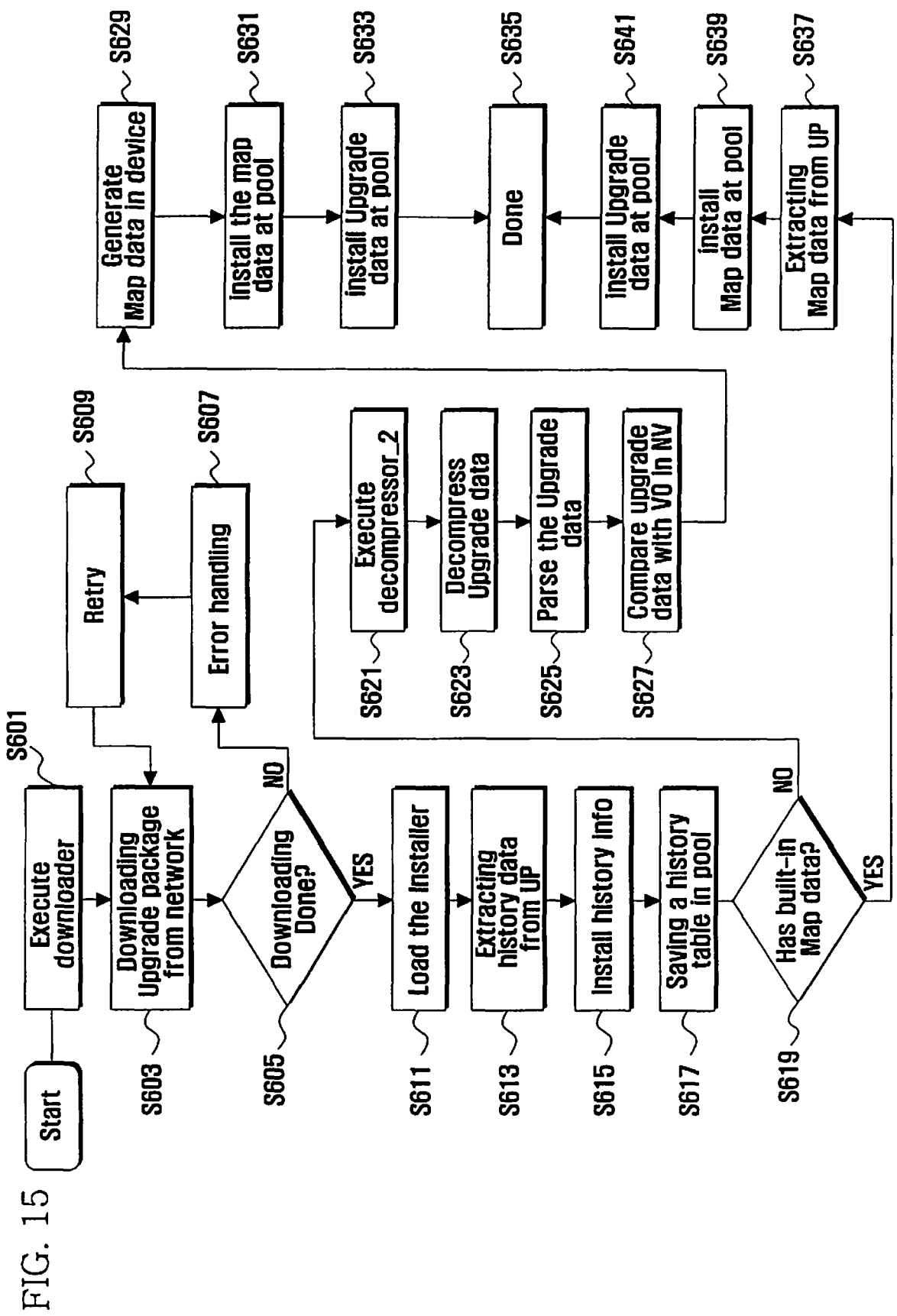
FIG. 15 is a flowchart illustrating an upgrade package installation procedure of the program upgrade method of FIG. 14.
Figure 16:
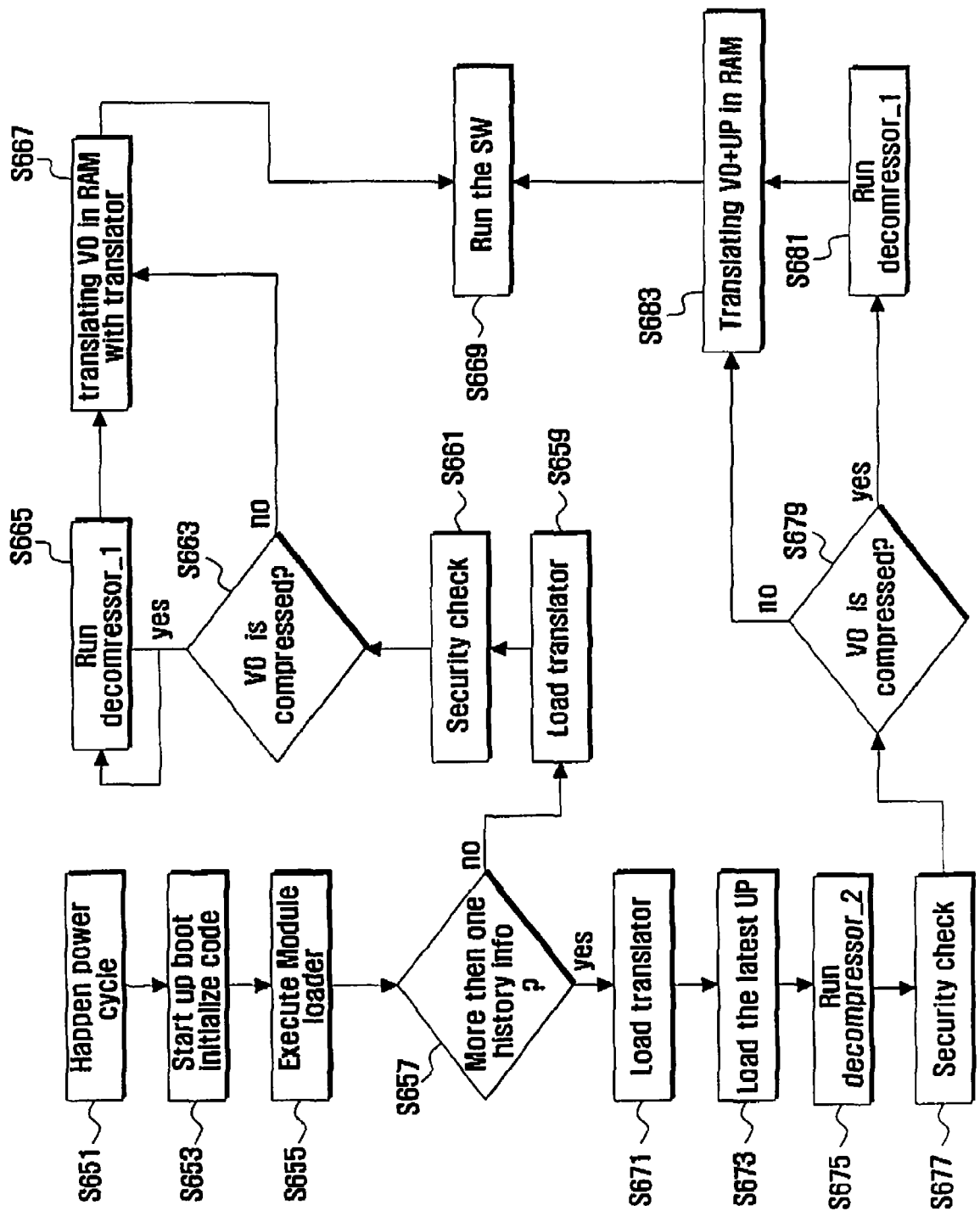
FIG. 16 is a version upgrade procedure of the program upgrade method of FIG. 14.

FIG. 15 is a flowchart illustrating an upgrade package installation procedure of the program upgrade method of FIG. 14, and FIG. 16 is a version upgrade procedure of the program upgrade method of FIG. 14.

Referring to FIG. 15, the recipient device 30 executes a downloader for downloading an upgrade package in Step 601 and downloads the upgrade package from the upgrade package server 20 in Step 603. The download procedure can be performed in different manner according to the communication link of the recipient device 30 and the upgrade package server 20. That is, the recipient device 30 can be connected to the upgrade package server 20 through a channel established on the basis of a communication standard such as CDMA, UMTS, GSM, GPRS, WiBro, Wi-Fi, WiMAX, Bluetooth®, UWB, Zigbee and USB.

The recipient device monitors the link to detect whether the download is successfully completed in Step 605. If an error is detected during the download session, the recipient device 30 performs an error handling process in Step 607 and retries the download in Step 609.

If it is determined that an error did not occur during the download session, the recipient device 30 loads the installer for installing the upgrade package within the first memory 250 in Step 611. Next, the recipient device 30 extracts the history data from the upgrade package (Step 615) and then stores the upgrade package in the upgrade package storage region of the first memory 250 in the form of a history table in Step 617.

Next, the recipient device 30 determines whether the upgrade package contains map data in Step 619. If the upgrade package contains map data, the recipient device 30 extracts the map data from the upgrade package in Step 637 and installs the map data within a part of the upgrade package storage region of the first memory 250 in Step 639. Next, the recipient device 30 stores the upgrade data within a corresponding part of the upgrade package storage region of the first memory in Step 641. Consequently, the recipient device 30 installs the history data, map data, and upgrade data within the corresponding parts of the upgrade package storage region designated for the upgrade package in Step 635.

Conversely, if the upgrade package does not contain map data at Step 619, the recipient device 30 executes the decompressor in Step 621, such that the decompressor performs decompressing on the upgrade package to extract the upgrade data in Step 623. Next, the recipient device 30 parses and stores the upgrade data in the first memory 250 in Step 625. Then, the recipient device 30 compares the upgrade data with the data of the first version of the program and obtains a difference between the upgrade data and the data of the first version in Step 627. Next, the recipient device 30 generates map data on the basis of the difference between the upgrade data and the first version in Step 629 and installs the map data and the upgrade data within corresponding parts of the upgrade package storage region of the first memory 250 In Steps 631 and 633.

If the upgrade data include map data, the recipient device 30 detects the map data at Step 625. In this case, the map data generation process can be omitted. The map data can be composed in the format as shown in FIG. 3F. As shown in FIG. 3F, the upgrade data are composed of the command strings having a command and indexes of blocks to be processed in accordance with the command. Since the upgrade data include the map data, the map data generation process can be omitted. In this case, Steps 627 to 633 are skipped.

As described above, the recipient device 30 downloads the upgrade package in response to an upgrade notification message, extracts the history data, map data, and upgrade data, and installs the extracted history data, map data and upgrade data in the corresponding parts of first memory 250. The map data can be included in the upgrade package or not. If map data is not included in the upgrade package, the recipient device 30 stores the map data in the first memory 250, generates map data by comparing the upgrade data with the first version as the reference version, and installs the map data within the first memory. If map data are included in the upgrade package, the map data generation process can be skipped.

FIG. 16 is a flowchart illustrating a version upgrade procedure of the program upgrade method of FIG. 14. Referring to FIG. 16, after the history data, map data, and upgrade data are installed in the first memory, the recipient device 30 detects a power-on event or an upgrade request command in Step 651. The recipient device 30 merges the lastly downloaded upgrade package with the first version of the program stored in the first memory 250, after the recipient device being initialized, such that the second version of the program is generated and loaded on the second memory 260 for operating the recipient device 30. The program loaded on the second memory 260 can be a system firmware, execution code and software, and their equivalents that can be stored in the nonvolatile memory.

If a power-on event occurs, the recipient device 30 performs a system initialization and then executes the loader for loading the first version of the program and the upgrade package in Steps 651 to 655. Next, the recipient device 30 checks the upgrade package storage regions of the first memory 250 to determine whether at least one upgrade package is stored in the first memory 250 in Step 657. If an upgrade package is not stored, the recipient device 30 executes the translator 240 for loading the first version of the program (Step 659) and performs a security check on the first program in Step 661. Next, the recipient device 30 checks whether the first version stored in the first memory 250 is compressed in Step 663. If the first version is compressed, the recipient device 30 runs a decompressor (decompressor_1) and then loads the decompressed first version on the second memory in Step 667. Consequently, the first version of the program runs on the second memory in Step 669. If it is determined that the first version is not compressed at Step 663, the Step 665 is skipped such that the first version is loaded (Step 667) and runs on the second memory 260 in Step 669.

Returning to Step 657, if at least one upgrade package is stored in the first memory 250, the recipient device executes the translator 240 in Step 671 and thus the translator 240 loads the latest upgrade package on the second memory 260 in Step 673. The upgrade package installed in the first memory includes at least two of the history data, map data, and upgrade data. Next, the recipient device 30 runs a decompressor (decompressor_2) and thus the decompressor performs decompression on the upgrade package (or only the upgrade data) in Step 675. Next, the recipient device 30 performs a security check on the decompressed upgrade package in Step 677 and determines whether the first version stored in the first memory 250 is compressed in Step 679. If the first version is compressed, the recipient device 30 runs the decompressor (decompressor_1) to decompress the first version in Step 681. Next, the recipient device 30 merges the first version with the upgrade package to generate the second version in Step 683. Consequently, the second version is loaded to run on the second memory 260 in Step 669. At Step 683, the upgrade data are mapped to the first version with reference to the map data. If it is determined that the first version of the program is not compressed at Step 679, Step 681 is skipped.

FIGS. 17A to 17G are flow diagrams illustrating a program upgrade method according to another exemplary embodiment of the present invention. In this embodiment, the recipient device 30 downloads an upgrade package from the upgrade package server, installs the upgrade package within a nonvolatile memory, generates an upgrade version of a target program by merging the upgrade package and a reference version of the target program, and loads the upgrade version to run on a volatile memory.

Figure 17A:
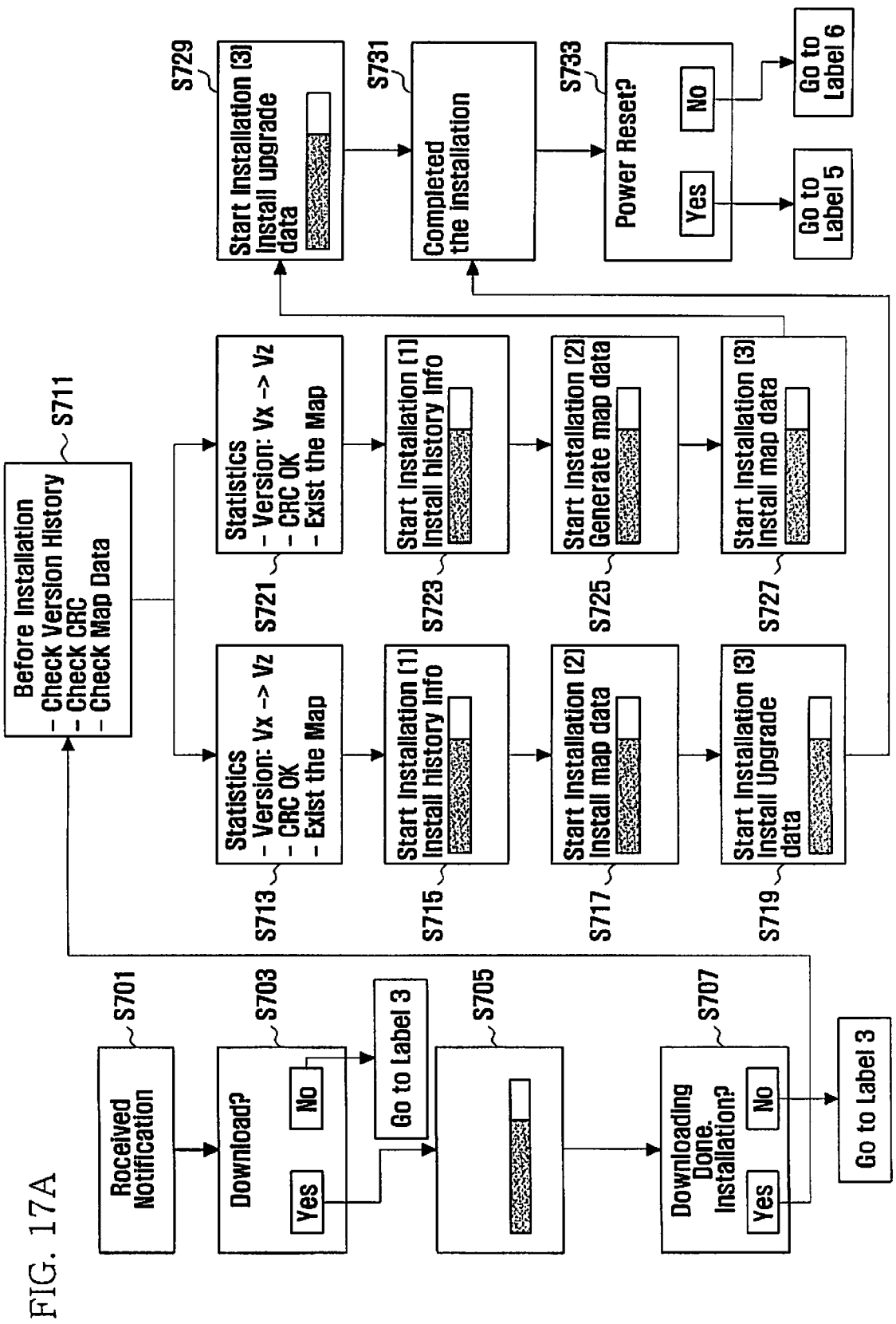
FIGS. 17A to 17G are flow diagrams illustrating a program upgrade method according to another exemplary embodiment of the present invention.
Figure 17B:
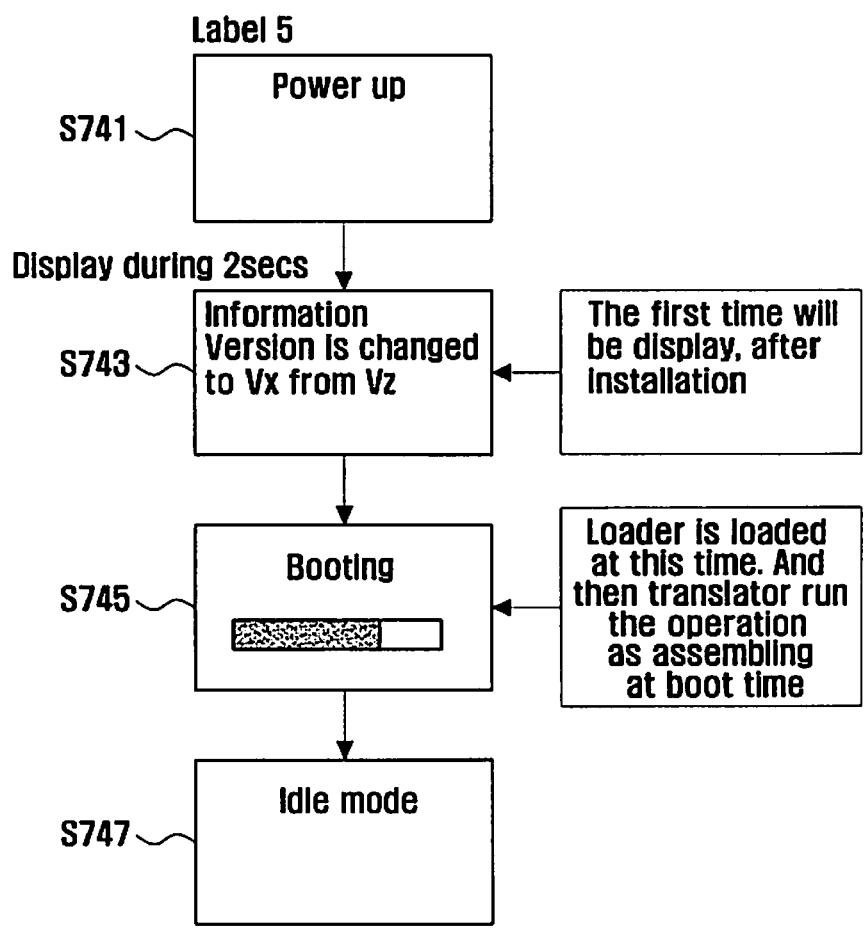
Figure 17C:
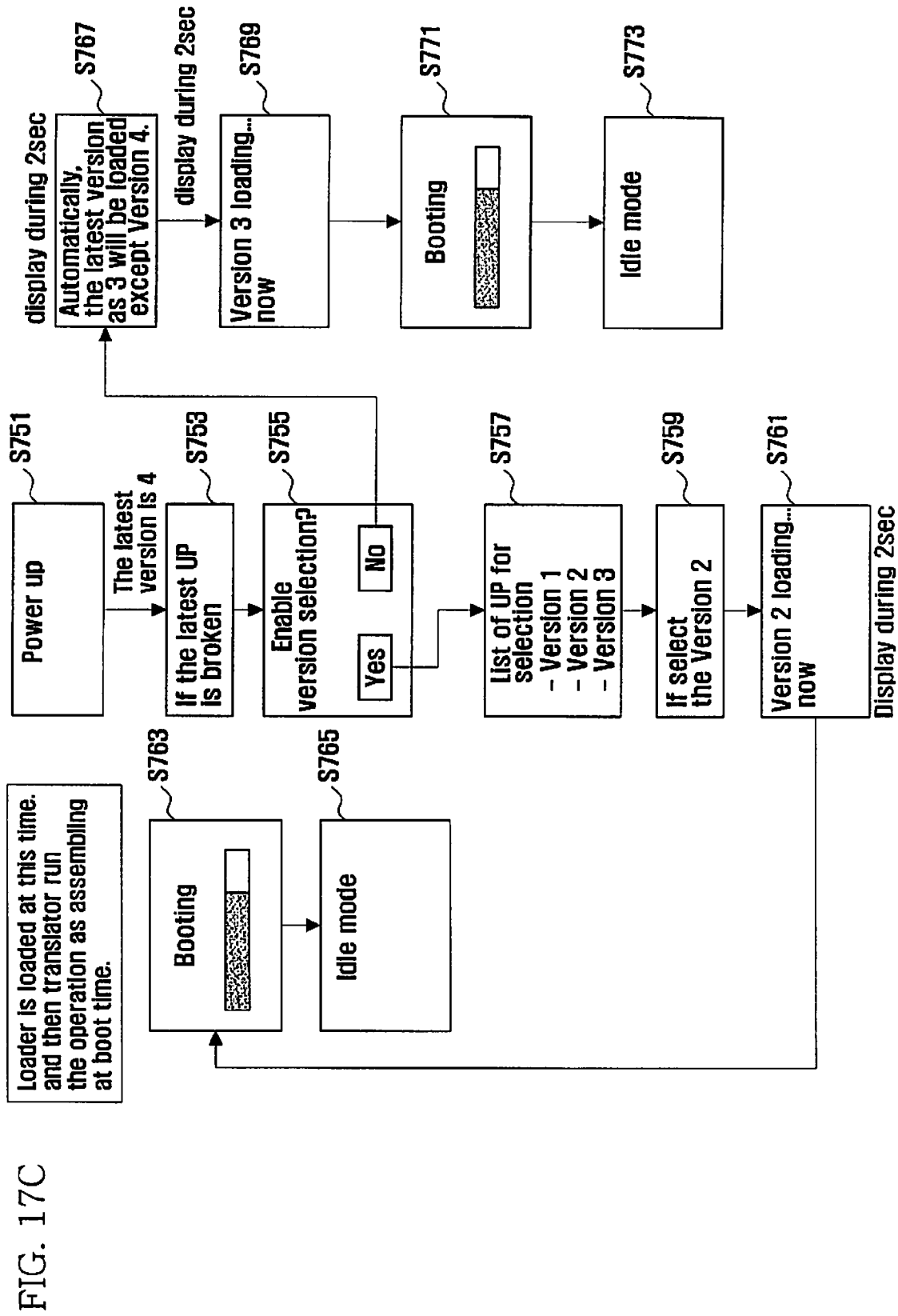
Figure 17D:
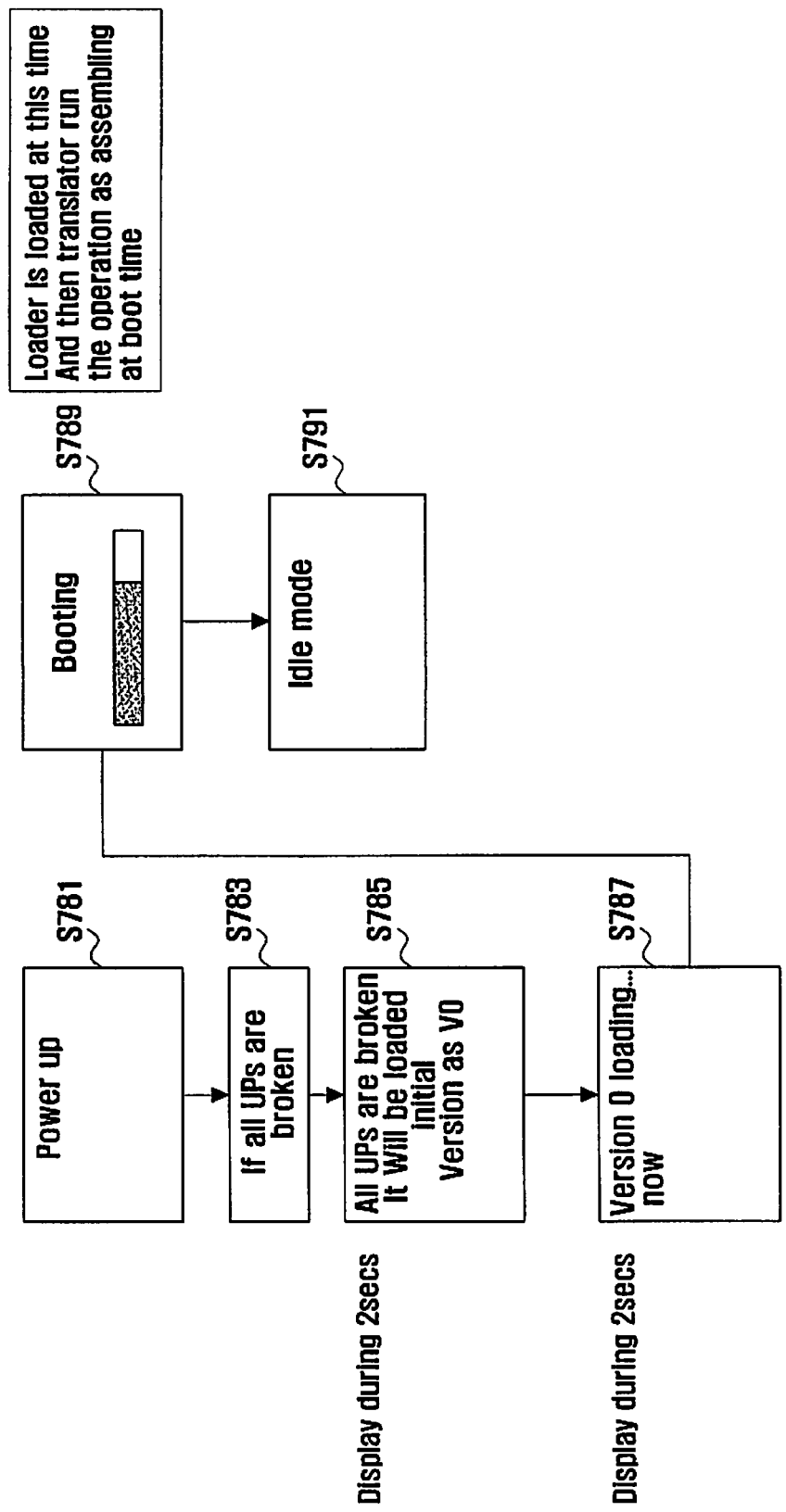
Figure 17E:
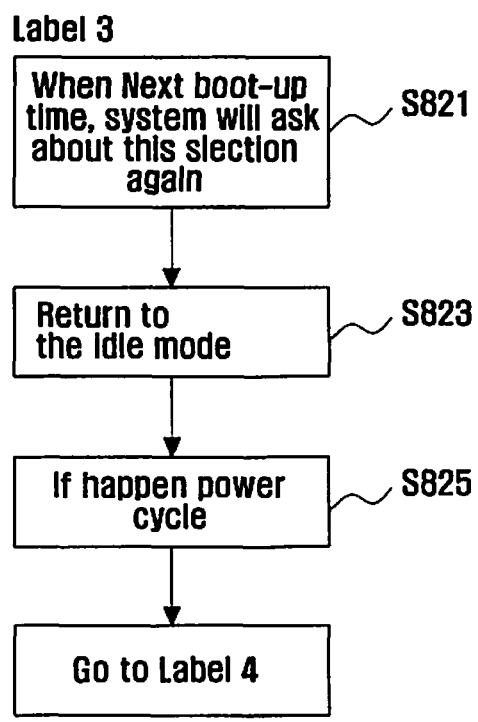
Figure 17F:
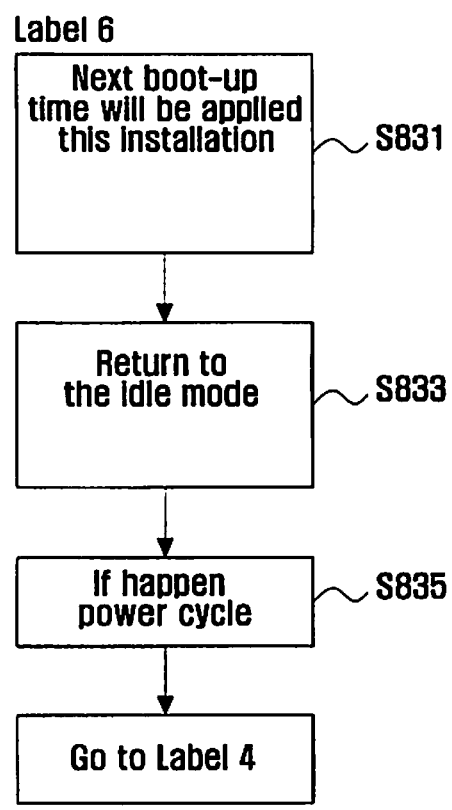
Figure 17G:
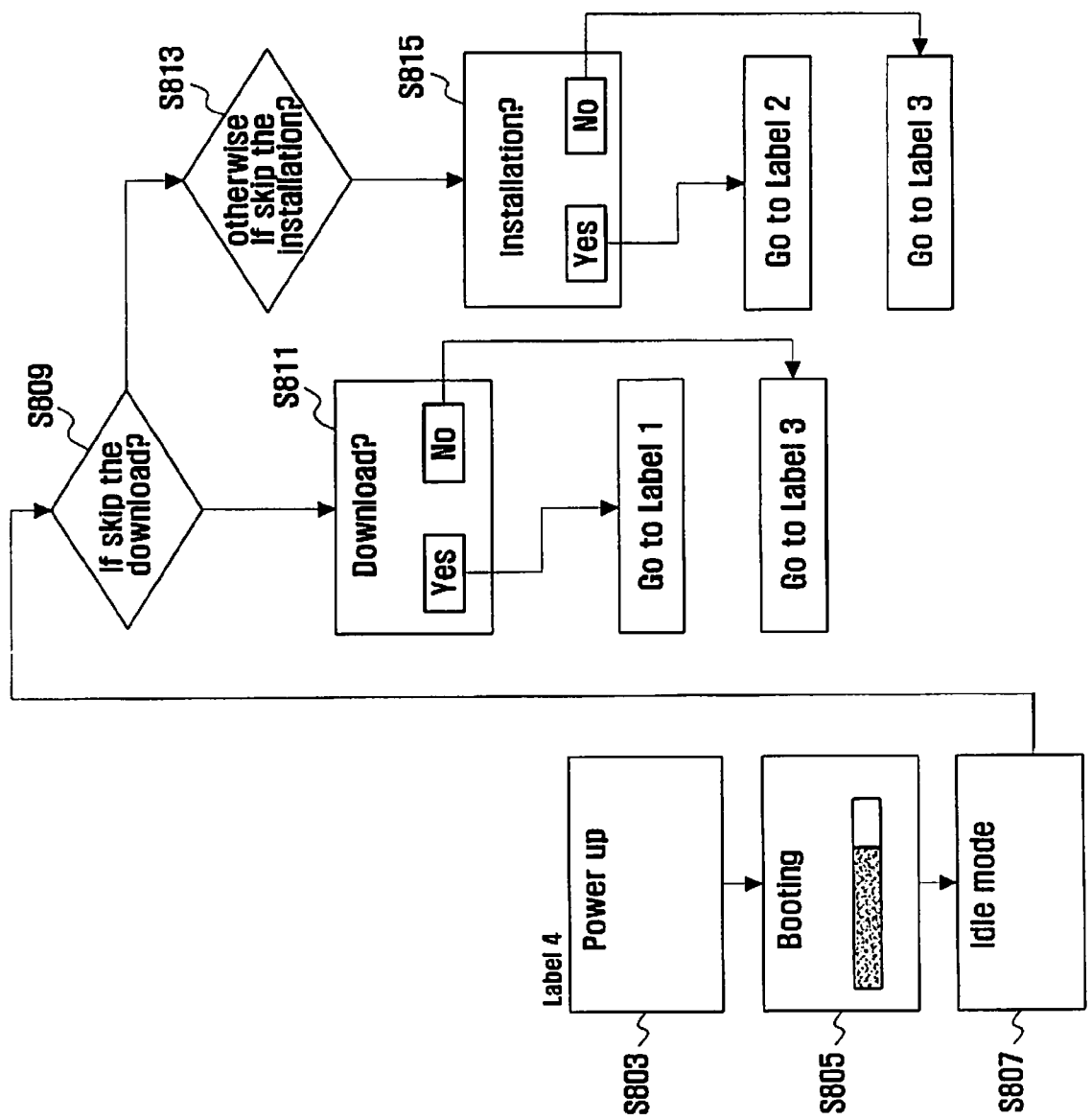

FIG. 17A is a flow diagram illustrating an upgrade package download and installation procedure of the program upgrade method according to an exemplary embodiment of the present invention, FIG. 17B is a flow diagram illustrating an upgrade package translation procedure of the program upgrade method according to an exemplary embodiment of the present invention, FIG. 17C is a flow diagram illustrating an upgrade package translation procedure of the program upgrade method according to another exemplary embodiment of the present invention, FIG. 17D is a flow diagram illustrating an upgrade package translation procedure of the program upgrade method according to another exemplary embodiment of the present invention, FIG. 17E is a flow diagram illustrating an upgrade package download and installation management procedure of a program upgrade method according to an exemplary embodiment of the present invention, FIG. 17F is a flow diagram illustrating an upgrade package download management procedure of a program upgrade method according to another exemplary embodiment of the present invention, and FIG. 17G is a flow diagram illustrating a reserved upgrade package download and installation procedure of the program upgrade method according to an exemplary embodiment of the present invention.

Referring to FIGS. 17A to 17G, if an upgrade package notification message is received from the upgrade package server 20 in Step 701, the recipient device 30 displays an upgrade announcement message on a display screen (not shown) in Step 703. If an upgrade request command is input in response to the upgrade announcement message, the recipient device 30 transmits an upgrade request message to the upgrade package server 20. Upon receiving the upgrade request message, the upgrade package server 20 starts transmitting the upgrade package. The recipient device 30 downloads the upgrade package while displaying a download status on the display screen in Step 705. The upgrade package is temporarily stored in a volatile memory, i.e. the second memory. If the download is complete, the recipient device 30 displays an announcement message notifying the download has been done and asking whether to install the downloaded upgrade package in Step 707.

Since the downloaded upgrade package is temporarily stored in the volatile memory, the upgrade package is preferably installed in the second storage region 320 of the first memory 250, i.e. the nonvolatile memory. This is because the upgrade package can be used after the recipient device 30 is rebooted.

If an install request command is input in response to the announcement message, the recipient device 30 checks install data contained in the upgrade package in Step 711. The install data includes history data and optional map data. The history data is provided with identifiers of the second version and a reference version with which upgrade data contained in the upgrade package is merged. The map data is provided with commands followed by indexes of blocks to be processed according to the commands. The map data can be packed in the upgrade package or not. At Step 711, the recipient device 30 checks the version (in this example, the program is upgraded from an old version Vx to a new version Vy) of the program represented by the upgrade package, CRC, and map data.

If it is determined that an upgrade from Vx to Vy, CRC is normal, and map data exists in Step 713 the installer 230 of the recipient device 30 installs the history data of the upgrade package within a history data storage part of the second storage region 320 of the first memory 250 (step 715), stores the map data of the upgrade package within a map data storage part of the second storage region 320 of the first memory 250 in Step 717, and stores the upgrade data of the upgrade package within an upgrade data storage part of the second storage region 320 of the first memory 250 in Step 719. When the map data includes the upgrade data, the installer 230 skips storing the upgrade data at Step 713. That is, if an install request is detected, the installer 230 of the recipient device 30 extracts the history data, map data, and upgrade data, and installs the data within the respective parts of the second storage region 320 of the first memory 250.

If it is determined that the program is upgraded from Vx to Vy, CRC is normal, and no map data exists in Step 721 the recipient device 30 installs the history data of the upgrade package with a corresponding part of the second storage region 320 of the first memory 250 as shown is FIGS. 7 and 8A in Step 723. Next, the recipient device 30 loads the first version (Vx) stored in the first memory 250 and generates the map data by mapping the upgrade data of the upgrade package to the first version in Step 725. The first version and the upgrade data are in the compressed state. In this case, the recipient device 30 generates the map data by comparing the first version and the upgrade data in unit of block. This is because the upgrade data are generated on the basis of differences obtained by comparing the first version (Vx) and the second version (Vy) in unit of block. Accordingly, when generating the map data at Step 823, the recipient device 30 compares the first version and the upgrade data in unit of block. Next, the recipient device 30 installs the map data within a map data storage region of the first memory 250 Step 727) and installs the upgrade data within an upgrade data storage part of the second storage region 320 of the first memory 250 in Step 729. That is, if an install request is detected, the recipient device 30 generates map data and then installs the history data, map data, and upgrade data within the respective parts of the second storage region 320 of the first memory 250. If the upgrade data includes the map data as in FIG. 3F, the recipient device 230 installs the upgrade data without generation of the map data. That is, if the upgrade data include command strings having indexes of the blocks to be processed between the first and second versions, the map data generation step is skipped.

The upgrade package (or the upgrade data) can be stored in a compressed state for improving utilization efficiency of the second memory 250 by reducing the volume of the upgrade package. The first memory 250 is provided with the first version of the program installed at the manufacturing phase or installed later as a reference version of the program. The first memory 250 is also provided with a plurality of upgrade package storage regions for storing a plurality of upgrade packages. Accordingly, the newly downloaded upgrade package is stored into one of the empty upgrade package storage regions. If all the upgrade package storage regions are full, the oldest upgrade package is deleted for securing the space for the latest upgrade package. In such manner, the recipient device 30 can maintain the recently downloaded upgrade packages. These upgrade packages can be selectively used when an upgrade process has failed, resulting in fault tolerant effect. If the upgrade package installation is completed in Step 731, the recipient device 30 displays an announcement message asking whether to perform a program upgrade with power reset in Step 733. If a power reset command is input in response to the announcement message, the recipient device 30 performs a power reset operation in Step 741 of FIG. 17B.

Referring to FIG. 17B, if a power-on event is detected, the recipient device 30 turns on the system power and performs system initialization. The system initialization is a hardware reset process. After the system initialization, the recipient device displays an announcement message informing that the program is changed from Vx to Vy in Step 743 and reboots the system with loading the translated upgrade package in Step 745. That is, the translator 240 of the recipient device 30 generates the second version of the program by merging the upgrade package with the first version and loads the second version on the second memory 260.

The second version generation process is described hereinafter in more detail. When the upgrade package includes the map data, the map data can be provided in the format of Tables 1 to 4. If the map data is formatted as shown in Tables 1, 2, and 4, the second version of the program is generated by merging the map data of the upgrade package with the first version of the program.

When the map data is formatted as in Table 1 "{C:0,15, F:0, null, null},{M:16,4 F:1, (16–12), (17–13), (18–8), (19–9),0, 0,0,0}, {S:20,5, F:0, (20–4), 0}", the recipient device 30 stores the blocks of the first version indicated by the block indexes flowing the commands C, M, and S as the corresponding blocks of the second version. In this case, the recipient device 30 stores the $0^{th}$ to $15^{th}$ blocks of the first version for the $0^{th}$ to $15^{th}$ blocks of the second version, places the $12^{th}$, $13^{th}$, $8^{th}$, and $9^{th}$ blocks of the first version for the $16^{th}$ to $19^{th}$ blocks of the second version, and places the $16^{th}$ to $20^{th}$ blocks of the first version for the $20^{th}$ to $24^{th}$ blocks of the second version.

When the map data are formatted as in Table 2 "{C:0,15, F:0, null, null}, {M:16,4 F:1, (16–12), (17–13), (18–8), (19–9), 0,code(B,K),code(E,C),0}, {S:20,5, F:0, (20–4), 0}", the recipient device 30 stores the blocks of the first version indicated by the block indexes following the commands C and S as the corresponding blocks of the second version, and generates blocks indicated by the block indexes following the command M using the blocks of the first version and entropy coded data. In this case, the recipient device 30 stores the $0^{th}$ to $15^{th}$ blocks of the first version for the $0^{th}$ to $15^{th}$ blocks of the second version, places the $12^{th}$ block code (B,K) and the $9^{th}$ block code (E, C) of the first version for the $16^{th}$ to $19^{th}$ blocks of the second version, and places the $16^{th}$ to $20^{th}$ blocks of the first version for the $20^{th}$ to $24^{th}$ blocks of the second version. Here, the code (B,K) means data obtained by entropy coding a difference between the $14^{th}$ block of the first version and the $17^{th}$ block of the second version. Also, the code (E,C)

means the data obtained by entropy coding a difference between the $8^{th}$ block of the first version and the $18^{th}$ block of the second version.

When the map data are formatted as in Table 3 "{C:0,15, F:0, null, null}, {M:16,4, F:2, null, null}, {S:20,5, F:0, (20–4), 0}", the recipient device 30 stores the blocks of the first version indicated by the block indexes following the commands C and S as the corresponding blocks of the second version, and generates blocks indicated by the blocks indexes following the command M by checking the block indexes and a number of the blocks and retrieving the blocks from the upgrade data on the basis of the indexes and the number of blocks. In this case, the recipient device 30 stores the $0^{th}$ to $15^{th}$ blocks of the first version for the $0^{th}$ to $15^{th}$ blocks of the second version, retrieves the $16^{th}$ to $19^{th}$ blocks from the upgrade data. Here, the $16^{th}$ to $19^{th}$ blocks can be represented by Z, W, P, and X.

When upgrade package includes the history data and upgrade data without map data, the recipient device 30 generates the map data by comparing the upgrade data and the first version of the program. If the upgrade data are provided with map information as shown in Table 5 "{C:0,6}, {M:6,2, X,Y}, {S:8,3,6,} {S:11,2,13}, {M:13,5, A,B,C,D,E}, {S:18, 7,15}" the map data generation can be skipped. In this case, the recipient device 30 generates the second version of the program using the upgrade data. If the upgrade data is provided in the format of Table 5, the recipient device 30 stores the $0^{th}$ to $5^{th}$ blocks of the first version for the $0^{th}$ the $5^{th}$ blocks of the second version, places blocks having respective data value X and Y for the $6^{th}$ and $7^{th}$ blocks of the second version, places the $6^{th}$ and $8^{th}$ block of the first version for the $8^{th}$ and $10^{th}$ block of the second version, places the $13^{th}$ and $14^{th}$ blocks of the first version for the $11^{th}$ and $12^{th}$ blocks of the second version, places blocks having respective data value A, B, C, D, and E for the $13^{th}$ to $17^{th}$ blocks of the second version, and $15^{th}$ to $21^{st}$ blocks of the first version for the $18^{th}$ to $24^{th}$ blocks of the second version.

At the first power-on event after installation of the upgrade package, the recipient device 30 displays the announcement message, during a predetermined time (in this embodiment, 2 seconds), informing that the old version Vx is modified to a new version Vz in Step 743 of FIG. 17B, generates the second version Vz by applying the upgrade package to the first version (i.e. translation) and stores the second version within the second memory 260 (S745). Consequently, the recipient device 30 enters an idle mode in Step 747.

As described above, the system power on function is set, the recipient device 30 loads the first version and the upgrade package on the first memory 250 and generates the second program by merging the first version and the upgrade package such that the second version is loaded to run on the second memory 260. The program upgrade is performed with a last version of the program. The recipient device 30 loads the first version and the upgrade package, generates the second version by merging the first version and the upgrade package, and loads the second version to run on the second memory 260, as shown in FIG. 17B.

If the program upgrade fails with the latest upgrade package, the program upgrade can be retried with another upgrade package installed in the first memory 250. In this embodiment, the recipient device 30 can install a plurality of upgrade packages in a nonvolatile memory, upgrade the first version of the program with the latest upgrade package or one of the upgrade packages selected by the user in system initialization process, and load the second version on the volatile memory. In this embodiment, although the program upgrade with an upgrade package fails, the system booting can be performed with the previous version of the program. Accordingly, if the latest upgrade package is found to be erroneous at Step 753 (FIG. 17C describing for example, a version number of the latest upgrade package is V#5), the recipient device 30 displays an announcement message asking whether to select another upgrade package in Step 755.

If a version selection command is input by the user in response to the announcement message, the recipient device 30 displays a list of version numbers of available upgrade packages (for example, #2, #3, and #4) in Step 757. If a selection command is input for selecting one of the version numbers in step 759, the recipient device 30 loads the upgrade package of the selected version number (Step 761) and generates the second version by merging the selected upgrade package with the first version of the program in Step 763. The second version is loaded to run on the second memory 260 for controlling general operation of the recipient device 30. After the second version is loaded on the second memory 260, the recipient device enters the idle mode (S765).

If a version selection command is not input in a predetermined time, the recipient device 30 loads the latest upgrade package (in this example, the upgrade package having version number #4) to replace the failed upgrade package (version number #5) in Steps 767 and 769 and generates the second version of the program by merging the upgrade package of version number #4 with the first version and loads the second version on the second memory in Step 771. After loading the second version, the recipient device 30 enters the idle mode. That is, if a user intended version selection function is not set and the latest upgrade package has failed for upgrading the program, the recipient device 30 tries to generate the second version by merging the next latest upgrade package with the first version.

Referring to FIG. 17D, if all the upgrade packages installed in the first memory 250 are found to be erroneous in Steps 781 and 783, the recipient device 30 loads the first version of the program installed in the first memory 250 on the second memory such that the first version runs for controlling the operations and function of the recipient device 30 in Steps 785 to 789. After loading the first version of the system on the second memory 260, the recipient device 30 enters the idle mode in Step 791.

If a user command is not input while displaying the announcement message asking whether to download an upgrade package or whether to install the downloaded upgrade package within the first memory 250, the recipient device 30 sets an announcement function for notifying an uncompleted process at the next boot-up time and in Step 821 (FIG. 17E) enters the idle mode in Step 823. That is, if the user does not input a command for downloading or installing an upgrade package, the recipient device 30 sets the uncompleted process announcement function and then enters the idle mode. Accordingly, if the system is rebooted, the recipient device 30 displays the announcement message asking whether to restart downloading or installing the upgrade package.

If the announcement message asking whether to translate the upgrade package after the upgrade package is installed is displayed and a translation request command is not input, the recipient device 30 sets to apply the installed upgrade package at the next boot-up time in Step 831 and enters the idle mode in Step 833. If the system initialization is performed in the idle mode in Step 835, the recipient device 30 starts upgrading the program using the latest upgrade package installed in the first memory 250. If no translation process is performed after upgrading the program with the latest upgrade package, the recipient device upgrades the program using the latest upgrade package at power-on of the system.

When a newly issued upgrade package is not downloaded, downloaded but not installed, or installed but not translated, the recipient device 30 displays an announcement message asking whether to download the newly issued upgrade package, whether to install the upgrade package downloaded but not installed, or whether to translate the installed but not translated. Referring to FIG. 17G, if the power-on event occurs in Step 803, the recipient device 30 is turned on and initialized to boot the system program in Step 805. During the boot-up process, the recipient device 30 loads the latest upgrade package from the first memory 250 and upgrades the system program with the latest upgrade package. That is, the retained upgrade process is restarted after the system is rebooted. After the upgraded system is booted up, the recipient device 30 enters the idle mode in Step 807. In the idle mode, the recipient device 30 determines whether an upgrade package download was skipped at the previous power-on state in Step 809. If an upgrade package that was not or was incompletely downloaded exists, the recipient device 300 displays an announcement message asking whether to download the upgrade package in Step 811. If a download request command is not input in response to the announcement message, the recipient device 30 performs the download procedure at step S705 of FIG. 17A. If a download request command is not input, the recipient device 30 sets the retained-download announcement option at Step 821 of FIG. 17E such that the announcement message asks whether to restart downloading the upgrade package at the next boot-up time. If a upgrade package of which download is retained does not exist, the recipient device 30 determines whether an upgrade package that is downloaded but not installed in Step 813. If an installation-retained upgrade package exists, the recipient device 30 displays an announcement message asking whether to install the installation-retained upgrade package in Step 815. If an installation request command is input in response to the announcement message, the recipient device 30 performs the installation process at Step 701 of FIG. 17A. On the other hand, if an installation request command is not input, the recipient device 30 sets the retained installation announcement option at Step 821 of FIG. 17E.

As described above, the recipient device 30 includes the first memory 250 as the nonvolatile memory, and the first memory 250 stores the first version of the program. The first version can be the initial version installed at the manufacturing phase of the recipient device 30. The recipient device 30 installs the upgrade packages whenever new upgrade package is downloaded. The first memory 250 is provided with a plurality of storage regions secured for installing the upgrade packages. The upgrade package provides upgraded version of the program. The upgrade package includes data of the first version and the upgrade data, or the upgrade data representing differences between the two versions of the program. In this embodiment, the upgrade package includes the upgrade data representing the differences between the two versions.

In this embodiment, the recipient device includes the second memory 260 as a volatile memory. The second memory 260 is preferably a work memory of the recipient device. The recipient device 30 is initialized in the system power-on. During the program booting process, the first version of the program and the latest upgrade package are loaded to be merged such that the second version of the program is generated and loaded on the second memory 260. Accordingly, the recipient device 30 operates with the second version of the program loaded on second memory 260.

In this embodiment, the download, installation, and translation process can be performed immediately when corresponding events occur or after the system is rebooted.

Figure 18:
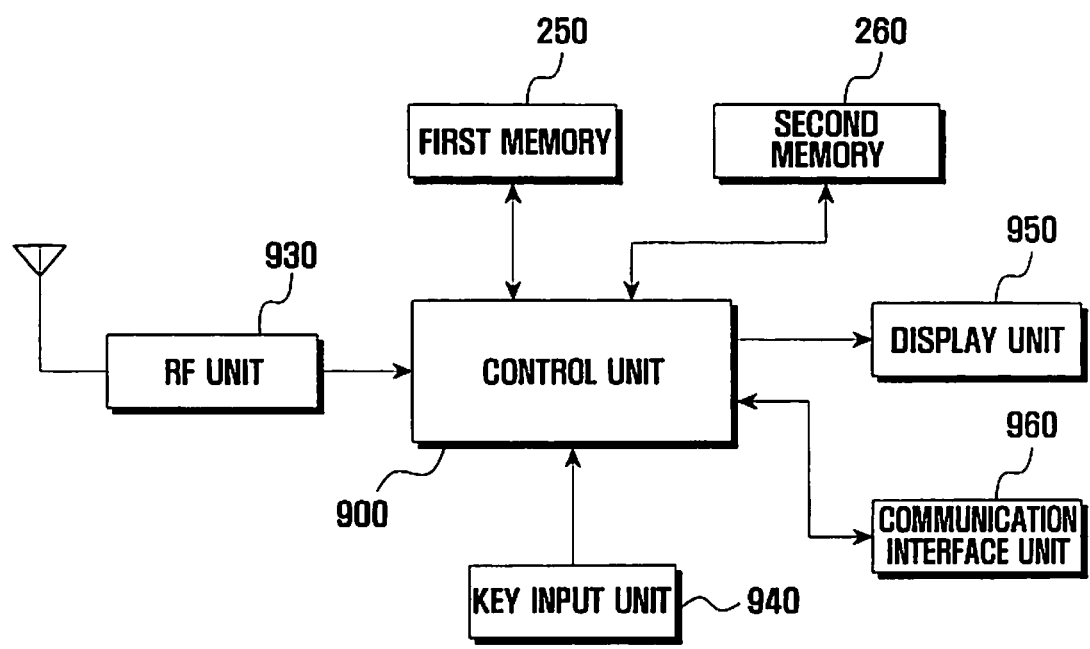
FIG. 18 is a block diagram illustrating a configuration of a mobile terminal according to an exemplary embodiment of the present invention.

Referring to FIG. 18, the mobile terminal includes a control unit 900, a Radio Frequency (RF) unit 930, a display unit 950, a key input unit 940, a communication interface unit 960, a first memory 250 and a second memory 260. The RF unit 930 is responsible for radio communication of the mobile terminal. The RF unit 930 includes an RF transmitter for performing frequency up-conversion and amplifying signal to be transmitted and an RF receiver for performing low-noise amplification and down-conversion of received signal.

The key input unit 940 is provided with a plurality of alphanumeric keys and various function keys.

The first memory 250 is a nonvolatile memory and includes a first region for storing a first version of a program and a second version for storing at least one upgrade package. The program can be an operating firmware or software, and the first version of the program is installed in the manufacturing phase. The upgrade package is a data package obtained from differences between the first version and a new version of the program. The upgrade package includes upgrade data to be applied for modifying the first version and install data including history data and map data. The map data can be provided with the upgrade data. In this case, the upgrade package includes the history data and the map data. Also, the upgrade data can be provided with the map data. In this case, the upgrade package includes the upgrade data and the history data. The second region of the first memory 250 is provided with storage parts for storing the respective upgrade packages.

The second memory 260 is a volatile memory as a work memory of the mobile terminal. The second memory 260 loads a second version of the program generated by merging the first version stored in the first region of the first memory 250 and the latest upgrade package stored in the second region of the first memory 250, at system reboot time.

The control unit 900 controls general operations of the mobile terminal. The control unit 900 is preferably provided with a codes for coding and decoding signals and a modem for modulating and demodulating the signals. If the mobile terminal is a mobile phone, the control unit 900 preferably is a Mobile Station Modem (MSM) chip integrating data and audio processing functionalities. The audio and data processing functionality can alternatively be separately implemented. In this embodiment, the control unit 900 includes a downloader for downloading the upgrade package from an upgrade package server 20, an installer for installing the downloaded upgrade package within a storage part of the second region of the first memory 250, and a translator for generating the upgrade version of the program by merging the first version with the upgrade package and loading the upgrade version on the second memory 260.

The display unit 950 displays various data output by the mobile terminal under the control of the control unit 900. The display unit 950 can be implemented with a liquid crystal display (LCD). In this case, the display unit 950 is provided with an LCD controller, memories for storing the display data, and LCD devices. With touchscreen functionality, the LCD display unit 950 includes input functionality.

The communication interface unit 960 is connected to the control unit 900 and provides a wired connection interface such as a Universal Serial Bus (USB) port, a short range wireless communication interface such as Bluetooth® and IrDA ports, or a wireless IP network interface such as WiBro, Wi-Fi, and WiMAX cards.

An upgrade package management operation of the above structured mobile terminal is described hereinafter. The control unit 900 of the mobile terminal can communicate with a base station using the RF unit 930. The base station can be a CDMA, UMTS, or GSM system and is connected to the upgrade package server 20 through at least one communication network. Also, the mobile terminal can access the upgrade package server 20 through the Internet utilizing the communication interface unit 960. If an upgrade package issuance notification message is received from the upgrade package server 20, the control unit 900 of the mobile terminal controls the RF unit 930 to download the upgrade package from the upgrade package server 20. The upgrade package is transmitted over the air in a wireless transmission format suitable for the wireless communication system such as CDMA, UMTS, and GSM system. The downloaded upgrade package is temporarily stored in the second memory 260 under the control of the control unit 900.

Since the second memory 260 is a volatile memory, the upgrade package should be installed in the first memory 250 as a nonvolatile memory such that the upgrade package can be retained for later usage. The control unit 900 also controls the display unit 950 to display the download status of the upgrade package and an announcement message asking whether to install the downloaded upgrade package. If an install request command is input in response to the announcement message, the control unit 900 installs the upgrade package within an empty storage part of the second region of the first memory. If there is no empty part, the oldest upgrade package stored in the second region of the first memory 250 is deleted to provide space to store the latest upgrade package. The upgrade package includes upgrade data and install data, and the install data includes history data and map data. The map data may not be packed in the upgrade package. Accordingly, the control unit 900 of the mobile terminal analyzes the upgrade package to determine whether the map data is included. If the upgrade package lacks map data, the control unit 900 generates map data by comparing the upgrade package and the first version of the program and installs the map data generated in such manner. When the upgrade package lacks explicit map data but the upgrade data is provided with map information, the installer 230 skips the generation of the map data and installs the upgrade data and history data within corresponding storage parts of the second region of the first memory 250. When the upgrade data is not explicitly packed in the upgrade package but the map data is implicitly provided with the upgrade data, the installer 230 installs the history data and map data within corresponding storage parts of the second region of the first memory 250.

If an install request command is not detected in a predetermined time, the control unit 900 of the mobile terminal sets an incomplete installation announcement option so as to display an announcement message asking whether to restart installation of the upgrade package at the next boot-up time. If an install request command is input in response to the announcement message, the control unit 900 controls the start of installing the upgrade package within the first memory 250. If the upgrade package is not stored, the control unit 900 controls to download the upgrade package form the upgrade package server 20 and then installs the downloaded upgrade package within the first memory 250. If it is not requested to install the downloaded upgrade package, the control unit 900 sets the incomplete installation announcement option again for notifying the incomplete installation of the upgrade package at the next boot-up time.

After being installed in the first memory 250, the upgrade package can be permanently stored. During the system initialization process, the control unit 900 loads the first version of the program and the latest upgrade package from the first memory 250 and generates the second version of the program by mapping the upgrade package to the first version such that the second version is loaded on the second memory 260. After loading the latest upgrade package, the control unit 900 analyzes the history data of the upgrade package to check the version numbers of the old and new versions of the program to be merged and merges the upgrade package with the new version (i.e. the first version) such that a new version (i.e. the second version) is generated and loaded on the second memory 260. Accordingly, the mobile terminal operates with the latest version of the program.

In this embodiment, the upgrade package download can be performed through a communication interface unit 960 rather the RF unit 930. That is, the mobile terminal can be connected to an external device such as a Personal Computer (PC) through a USB port or a short range wireless communication link for receiving an upgrade package downloaded by the PC. The control unit 900 can upgrade the program through the above download, installation, and translation processes.

As described above, the program upgrade system and method for an OTA-capable device performs upgrade with an upgrade package generated on the basis of differences between a reference version and a new version of the program, whereby it is possible to reduce package generation download times. Also, the program upgrade system and method for an OTA-capable device install downloaded upgrade packages within separated storage regions of a nonvolatile memory and generate an upgraded version by merging a reference version of a program and one of the upgrade packages within a volatile memory, resulting in stable program upgrade and fault tolerant effect.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A program upgrade apparatus for a mobile terminal, the apparatus comprising:
    a first memory for storing a reference version of a program comprising reference data and for storing at least one upgrade package comprising upgrade data, where the at least one upgrade package respectively corresponds to at least one upgraded version of the program;
    a second memory for loading an upgraded version of the program;
    a communication unit for communicating with an external system; and
    a control unit for controlling the communication unit to download the upgrade package in response to an upgrade notification message received from the external system, installing the upgrade package corresponding to a specific upgrade version in the first memory, generating the specific upgrade version of the program by merging the upgrade package and the reference version in the second memory based on map data included in the upgrade package, and operating the mobile terminal with the specific upgrade version of the program,
    wherein the upgrade data is generated on the basis of a difference between the reference version and the upgrade version of the program,
    wherein the control unit checks whether the upgrade package includes the map data for mapping the upgrade data to the reference data, and generates, when the upgrade package does not include the map data, the map data by comparing the reference data and the upgrade data, and
wherein the map data comprises indexes each corresponding to a result of the comparison of the reference data and the upgrade data in units of a block, and each of the indexes comprising a block index c, a block index m, or a block index d, indicating commands "copy", "modify", and "shift", respectively.

2. The program upgrade apparatus of claim 1, wherein the upgrade package further comprises the upgrade data and an install data providing information for merging the upgrade package with the reference version of the program.

3. The program upgrade apparatus of claim 2, wherein the install data comprises:
 a history data including version identifiers of the upgrade version represented by the upgrade package and the reference version of the program.

4. The program upgrade apparatus of claim 3, wherein the reference version of the program comprises at least two data blocks and the map data.

5. The program upgrade apparatus of claim 3, wherein the control unit installs the history data, the map data, and the upgrade data within the first memory.

6. The program upgrade apparatus of claim 1, wherein the reference version of the program is a system firmware or software installed in a manufacturing phase.

7. A program upgrade method for a mobile terminal, the method comprising:
 downloading at least one upgrade package of a program comprising upgrade data, the at least one upgrade package respectively corresponding to at least one upgraded version of the program;
 installing the upgrade package corresponding to a specific upgrade version in a first memory;
 generating the upgrade version of the program by merging a reference version of the program and the upgrade package in a second memory based on map data included in the upgrade package; and
 operating the mobile terminal with the specific upgrade version of the program,
 wherein the upgrade data is generated on the basis of a difference between the reference version and the upgrade version of the program;
 wherein installing the upgrade package comprises:
  determining whether the map data for mapping the upgrade data to the reference data is included in the upgrade package; and
  generating, when the upgrade package does not include the map data, the map data by comparing the reference data and the upgrade data, and
 wherein the map data comprises indexes each corresponding to a result of the comparison of the reference data and the upgrade data in units of a block, and each of the indexes comprising a block index c, a block index m, or a block index d, indicating commands "copy", "modify", and "shift", respectively.

8. The program upgrade method of claim 7, wherein the upgrade package further comprises a history data including version identifiers of the upgrade version represented by the upgrade package and the reference version of the program.

9. The program upgrade method of claim 8, wherein installing the upgrade package comprises:
 extracting the history data, the map data, and the upgrade data from the upgrade package; and
 installing the history data, the map data, and the upgrade data.

10. The program upgrade method of claim 8, wherein installing the upgrade package comprises:
 generating the history data, the map data, and the upgrade data from the upgrade package; and
 installing the history data, the map data, and the upgrade data.

11. The program upgrade method of claim 8, wherein the first memory comprises:
 a first region for storing the reference version; and
 a second region for storing the at least one upgrade package,
 wherein installing the upgrade package further comprises:
 installing the upgrade data in the second region; and
 installing the map data in the second region.

12. The program upgrade method of claim 7, wherein the upgrade package is a package of a latest version of the program.

13. The program upgrade method of claim 7, wherein the first memory is a nonvolatile memory and the second memory is a volatile memory.

14. The program upgrade method of claim 7, wherein installing the upgrade package comprises:
 receiving an upgrade request including a selection of the specific upgrade version; and
 installing, in response to the upgrade request, the upgrade package corresponding to a selected upgrade version.

15. The program upgrade method of claim 14, wherein the upgrade request is generated by one of a user input after the upgrade package is completely installed and a system initialization event.

16. The program upgrade method of claim 8, wherein generating the upgrade version of the program comprises:
 determining the reference version of the program to be upgraded on the basis of the history data; and
 creating, when the reference version is to be upgraded, the upgrade version of the program by mapping the upgrade data to the reference version of the program based on the map data.

17. The program upgrade apparatus of claim 1, wherein the control unit comprises:
 an installer for installing the upgrade package in the second region of the first memory; and
 a translator for loading the upgrade package and the reference version of the program from the first memory, generating the upgraded version of the program by merging the upgrade package with the reference version of the program in the second memory.

18. The program upgrade apparatus of claim 1, wherein the first memory is a nonvolatile memory and the second memory is a volatile memory.

19. The program upgrade apparatus of claim 1, wherein the first memory comprises:
 a first region for storing the reference version; and
 a second region for storing the at least one upgrade package,
 wherein the control unit installs the upgrade package in the second region and merges the upgrade data and the reference version in the second memory.

20. The program upgrade apparatus of claim 19, wherein the control unit installs a history data extracted from the upgrade package in the second region of the first memory, installs the map data in the second region of the first memory, and installs the upgrade data in the second region of the first memory.

21. The program upgrade apparatus of claim 1, wherein the control unit selects the upgrade package from among a plurality of upgrade packages, which are stored in the first memory, for updating the reference version of the program, and
    wherein if operation the mobile terminal with the upgrade version of the program is unsuccessful, the controller generates another upgrade version of the program by merging another upgrade package selected from among the plurality of upgrade packages with the reference version, loads the another upgrade version of the program into the second memory, and operates the mobile terminal with the another upgraded version of the program.

22. The program upgrade method of claim 7, wherein the upgrade package is selected from among a plurality of upgrade packages, which are stored in the first memory, for updating the reference version of the program of the second memory, and
    further comprising, if operating the mobile terminal with the upgrade version of the program is unsuccessful, generating another upgrade version of the program by merging another upgrade package selected from among the plurality of upgrade packages with the reference version, loading the another upgrade version of the program into the second memory, and operating the mobile terminal with the another upgraded version of the program.

\* \* \* \* \*